(12) United States Patent
Noble et al.

(10) Patent No.: US 7,926,836 B2
(45) Date of Patent: Apr. 19, 2011

(54) ELASTOMERIC SPRING VEHICLE SUSPENSION

(75) Inventors: Shawn David Noble, Naperville, IL (US); Ashley Thomas Dudding, Yorkville, IL (US); Christopher Wayne Forrest, Auburn, IN (US); Michael Brannigan, Narberth, PA (US); John Wayne Stuart, Dyersburg, TN (US); Michael Patrick Robinson, Chicago, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 132 days.

(21) Appl. No.: 12/045,069

(22) Filed: Mar. 10, 2008

(65) Prior Publication Data
US 2009/0224504 A1 Sep. 10, 2009

(51) Int. Cl.
*B60G 5/00* (2006.01)
*B60G 11/22* (2006.01)
(52) U.S. Cl. ........... 280/677; 280/124.177; 280/124.178
(58) Field of Classification Search .................. 280/104, 280/676, 677, 681, 682, 687, 124.177, 124.178
See application file for complete search history.

(56) References Cited

U.S. PATENT DOCUMENTS

| | | |
|---|---|---|
| 1,409,044 A | 3/1922 | Tusar |
| 1,516,051 A | 11/1924 | Lundie |
| 1,604,961 A | 11/1926 | Bell et al. |
| 1,608,507 A | 11/1926 | Hogan |
| 1,679,528 A | 8/1928 | Johanson |
| 1,817,325 A | 8/1931 | Sinkovich |
| 1,853,166 A | 4/1932 | Nibbe |
| 1,949,363 A | 2/1934 | Willard |
| 2,094,335 A | 9/1937 | Willard et al. |
| 2,788,222 A | 4/1957 | Wilson et al. |
| 2,905,390 A | 9/1959 | Saul |
| 2,980,439 A | 4/1961 | Miller |
| 3,004,715 A | 10/1961 | Gadd |
| 3,121,560 A | 2/1964 | Reed |
| 3,134,585 A | 5/1964 | Haywood |

(Continued)

FOREIGN PATENT DOCUMENTS

DE 973418 C 2/1960

(Continued)

OTHER PUBLICATIONS

Hendrickson, A Boler Company, Hendrickson Frame Hanger Selection Guide, May 1990.

(Continued)

*Primary Examiner* — Paul N Dickson
*Assistant Examiner* — Joseph Rocca
(74) *Attorney, Agent, or Firm* — McDonnell Boehnen Hulbert & Berghoff

(57) ABSTRACT

An elastomeric spring suspension is described for supporting a longitudinally extending vehicle frame rail above first and second axles forming a tandem axle configuration. The suspension includes a frame hanger assembly mounted to the vehicle frame rail. The frame hanger assembly has two full spring modules, each of which includes two elastomeric shear springs, an elastomeric progressive spring rate load cushion having a pyramidal shape with a flattened top surface and a spring mount for mounting the springs. A saddle assembly is connected to the spring mount, and an equalizing beam is connected to the saddle assembly and further connected to the axles. The spring rate for the suspension increases almost linearly as a function of sprung load, resembling a pneumatic suspension. Accordingly, the suspension exhibits excellent ride quality, without sacrificing roll stability.

45 Claims, 22 Drawing Sheets

U.S. PATENT DOCUMENTS

| | | | |
|---|---|---|---|
| 3,279,820 | A | 10/1966 | Hickman |
| 3,485,040 | A | 12/1969 | Niskanen |
| 3,539,170 | A | 11/1970 | Hamel |
| 3,545,787 | A * | 12/1970 | Miller .......................... 280/687 |
| 3,580,611 | A | 5/1971 | McNitt |
| 3,618,971 | A | 11/1971 | Wragg |
| 3,695,737 | A | 10/1972 | Alexander et al. |
| 3,731,913 | A | 5/1973 | Hirst |
| 3,797,851 | A | 3/1974 | Hirst |
| 3,817,551 | A | 6/1974 | Moore |
| 3,955,808 | A | 5/1976 | Jorn et al. |
| D240,239 | S | 6/1976 | Calandrino |
| 3,984,125 | A * | 10/1976 | Paton et al. ............ 280/124.177 |
| 3,997,151 | A | 12/1976 | Leingang |
| 4,082,316 | A * | 4/1978 | Raidel .......................... 280/681 |
| 4,095,690 | A | 6/1978 | Baldwin |
| 4,111,406 | A | 9/1978 | Zanow |
| 4,132,433 | A | 1/1979 | Willett |
| 4,144,978 | A | 3/1979 | Drake |
| 4,162,799 | A | 7/1979 | Willetts |
| 4,182,338 | A | 1/1980 | Stanulis |
| 4,193,612 | A | 3/1980 | Masser |
| 4,213,633 | A | 7/1980 | Moore et al. |
| 4,358,096 | A | 11/1982 | Paton et al. |
| 4,371,189 | A | 2/1983 | Raidel |
| 4,382,547 | A | 5/1983 | Phillips |
| 4,420,171 | A | 12/1983 | Raidel |
| 4,452,007 | A | 6/1984 | Martin |
| 4,486,029 | A | 12/1984 | Raidel |
| 4,504,080 | A | 3/1985 | VanDenberg |
| 4,705,294 | A | 11/1987 | Raidel |
| 4,753,456 | A | 6/1988 | Booher |
| 4,793,597 | A | 12/1988 | Smith |
| D306,476 | S | 3/1990 | Millard |
| 4,944,402 | A | 7/1990 | Wu |
| 4,995,636 | A | 2/1991 | Hall et al. |
| 5,114,178 | A | 5/1992 | Baxter |
| 5,150,918 | A | 9/1992 | Heitzmann |
| 5,237,933 | A | 8/1993 | Bucksbee |
| D344,254 | S | 2/1994 | Zimmerman |
| 5,327,674 | A | 7/1994 | Powell |
| 5,413,320 | A | 5/1995 | Herbst |
| D377,961 | S | 2/1997 | Dickson et al. |
| 5,676,356 | A | 10/1997 | Ekonen et al. |
| D390,305 | S | 2/1998 | Dickson et al. |
| 5,753,429 | A | 5/1998 | Pugh |
| 5,810,337 | A | 9/1998 | McLaughlin |
| 5,868,384 | A | 2/1999 | Anderson |
| 5,887,881 | A | 3/1999 | Hatch |
| 5,938,221 | A | 8/1999 | Wilson |
| 5,957,441 | A | 9/1999 | Tews |
| 5,989,075 | A | 11/1999 | Hsiao et al. |
| D423,342 | S | 4/2000 | Popesco |
| 6,045,328 | A | 4/2000 | Jones |
| 6,129,369 | A | 10/2000 | Dudding |
| 6,176,345 | B1 | 1/2001 | Perkins et al. |
| 6,189,904 | B1 | 2/2001 | Gentry et al. |
| 6,276,674 | B1 | 8/2001 | Randell |
| 6,328,294 | B1 | 12/2001 | Palinkas |
| 6,478,321 | B1 | 11/2002 | Heitzmann |
| D471,888 | S | 3/2003 | Solland |
| D474,274 | S | 5/2003 | Walters |
| 6,572,087 | B2 | 6/2003 | Schleinitz et al. |
| 6,585,286 | B2 | 7/2003 | Adema et al. |
| 6,659,438 | B2 | 12/2003 | Michael et al. |
| 6,666,474 | B2 * | 12/2003 | Pavuk .......................... 280/677 |
| D496,887 | S | 10/2004 | Carlson |
| 6,817,301 | B1 | 11/2004 | Bullock |
| 6,877,623 | B2 | 4/2005 | Salis |
| D507,658 | S | 7/2005 | Wescott, III |
| D515,942 | S | 2/2006 | Hamblin et al. |
| D515,943 | S | 2/2006 | Hamblin et al. |
| D519,104 | S | 4/2006 | Rlchter |
| 7,185,903 | B2 | 3/2007 | Dove |
| D543,492 | S | 5/2007 | Lyew |
| 7,229,088 | B2 | 6/2007 | Dudding et al. |
| 7,234,723 | B2 | 6/2007 | Sellers |
| D551,315 | S | 9/2007 | Zimmerman |
| 7,303,200 | B2 | 12/2007 | Ramsey |
| 7,320,538 | B2 | 1/2008 | Ko et al. |
| D603,303 | S | 11/2009 | Noble et al. |
| D606,459 | S | 12/2009 | Noble et al. |
| D610,952 | S | 3/2010 | Noble et al. |
| D615,005 | S | 5/2010 | Noble et al. |
| D632,230 | S | 2/2011 | Noble et al. |
| D633,011 | S | 2/2011 | Noble et al. |
| 2002/0163165 | A1 * | 11/2002 | Adema et al. ................. 280/682 |
| 2003/0047907 | A1 | 3/2003 | Hicks et al. |
| 2004/0262877 | A1 | 12/2004 | Sellers |
| 2005/0110233 | A1 | 5/2005 | Hedenberg |
| 2006/0071441 | A1 | 4/2006 | Mathias |
| 2006/0208445 | A1 | 9/2006 | Gideon |
| 2007/0262547 | A1 | 11/2007 | Warinner |
| 2008/0018070 | A1 | 1/2008 | Gottschalk |
| 2008/0030006 | A1 | 2/2008 | Sellers |
| 2008/0122146 | A1 | 5/2008 | Herntier et al. |
| 2008/0134413 | A1 | 6/2008 | Guo |
| 2008/0258361 | A1 | 10/2008 | Wen et al. |
| 2008/0290572 | A1 | 11/2008 | Desprez et al. |
| 2009/0008846 | A1 | 1/2009 | Yamakawa et al. |
| 2009/0108086 | A1 | 4/2009 | Mospan et al. |
| 2009/0230650 | A1 | 9/2009 | Mayen et al. |

FOREIGN PATENT DOCUMENTS

| | | | |
|---|---|---|---|
| EP | 1911661 | A1 | 4/2008 |
| EP | 2006129 | A1 | 12/2008 |
| FR | 2550918 | A1 | 3/1985 |
| FR | 2797432 | A1 | 2/2001 |
| GB | 2128942 | A2 | 11/1970 |
| GB | 2069424 | A | 8/1981 |
| GB | 2226867 | A1 | 7/1990 |
| GB | 2252276 | A | 8/1992 |
| WO | 0242097 | A2 | 5/2002 |
| WO | 2006067551 | A | 6/2006 |

OTHER PUBLICATIONS

Hendrickson, A Boler Company, Hendrickson RS Series, Single Axle Supension, Sep. 1995.

Hendrickson, RS Series Rubber Load Cushion, Only Hendrickson makes choosing a heavy-duty suspension this easy, Jun. 1993.

Hendrickson, A Boler Company, HN Series Technical Sales Publication, Jun. 1997.

Hendrickson Suspension, RS Series rubber load cushion, Jul. 1991.

Hendrickson Mfg., Tandem Division, Wide spread equalizing beams, sales bulletin, May 1981.

Hendrickson Mfg. Co., Tandem Division, Hendrickson Tandem Suspensions for GMC Trucks, Aug. 1979.

Hendrickson, The Boler Company, RS Frame Hanger, Dec. 1997.

Hendrickson, A Boler Company, RS Series Rubber Load Cushion Suspensions, Mar. 1996.

Hendrickson, A Boler Company, RS Series Rubber Load Cushion Suspensions, Jul. 1996.

Hendrickson, A Boler Company, RS Series Rubber Load Cushion, Mar. 1998.

Hendrickson Suspension, HN Series Premium Rubber, Hendrickson introduces a completely new concept in Walking Beam Suspension, Jun. 1993.

Hendrickson Suspension, A Boler Company, Hendrickson HNT Series, Feb. 1992.

Hendrickson Suspension, Sales Engineering Update, Mar. 1993.

Hendrickson Truck Suspension Systems, A Boler Company, RS Series Rubber Load Cushion, Dec. 1996.

Hendrickson Truck Suspension Systems, A Boler Company, RS Series Rubber Load Cushion, Apr. 1998.

Hendrickson Truck Suspension Systems, A Boler Company, HN Series VariRate Spring System, May 1997.

Hendrickson Truck Suspension Systems, A Boler Company, HN Series VariRate Spring System, Nov. 1997.

Hendrickson Truck Suspension Systems, A Boler Company, HN Series VariRate Spring System, Sep. 1998.

Hendrickson Truck Suspension Systems, A Boler Company, HN Series VariRate Spring System, Jul. 1999.

Hendrickson, HN Series VariRate Spring System, Nov. 2000.

Hendrickson, HN Series VariRate Spring System, Nov. 2005.
Hendrickson Truck Suspension Systems, A Boler Company, HN 402, Feb. 1996.
Hendrickson Truck Suspension Systems, A Boler Company, R Series Solid Mount, Jul. 1999.
Hendrickson Truck Suspension Systems, A Boler Company, RS Series Rubber Load Cushion, Jun. 1999.
Hendrickson, Haulmaax Heavy Duty Suspension, Oct. 2001.
Hendrickson, Haulmaax Heavy Duty Suspension, Dec. 2003.
Hendrickson, Haulmaax Heavy Duty Suspension, Mar. 2005.
Hendrickson, Haulmaax Heavy Duty Suspension, Jan. 2007.
Hendrickson, Haulmaax Heavy Duty Suspension, Mar. 2008.
Hendrickson, Assembly Instructions Haulmaax, Subject: Kit Nos. 64178-003 & 004, Feb. 2003.
Hendrickson, Assembly Instructions Haulmaax, Subject: Tie-bar Bolster Spring Kit Nos. 64179-037, Jun. 2006.
Hendrickson, Assembly Instructions Haulmaax, Subject: Outboard Frame Bracket for Paccar Vehicles Built after May 1, 2005 through Aug. 31, 2006, Oct. 2006.
Hendrickson, Assembly Instructions Haulmaax Saddle Assembly, Subject: Service Kit No. 57974-048, Dec. 2008.
Hendrickson, Technical Bulletin HN 402/462/522, Subject: Auxiliary Spring Shim Design, Oct. 2000.
Hendrickson, Technical Bulletin HN 402/462/522, Subject: Auxiliary Spring Shim Design, Dec. 2000.
Hendrickson, Technical Bulletin HN 402/462/522, Subject: Auxiliary Spring Shim Design, Jun. 2006.
Hendrickson, Technical Bulletin Haulmaax Series, Subject: Mandatory Shock Applications, Nov. 2004.
Hendrickson, Technical Bulletin R, RS, RT/RTE 46K Capacity, Subject: 46K Heavy-Duty Beam Option, Dec. 2004.
Hendrickson, Technical Bulletin Haulmaax, Subject: 54" Equalizing Beam Assembly, Oct. 2005.
Hendrickson, Technical Bulletin Haulmaax 460, Subject: Bolster Spring Assembly with Tie-bar, Jun. 2006.
Hendrickson Truck Supension Systems, A Boler Company, Sales engineering update, Subject: HN-402/462 Auxiliary Spring Assembly, Aug. 1998.
Hendrickson Truck Supension Systems, A Boler Company, Sales engineering update, Subject: Model Designation and Discontinuance, Aug. 1999.
Hendrickson Truck Supension Systems, A Boler Company, Sales engineering update, Subject: Equalizer Beam, Aug. 1999.
Hendrickson, Parts List RS Series, Nov. 2004.
Hendrickson, Parts List Haulmaax, May 2002.
Hendrickson, Parts List Haulmaax, Jul. 2003.
Hendrickson, Parts List Haulmaax, Jul. 2006.
Hendrickson, Parts List Haulmaax, Dec. 2007.
Hendrickson, Parts List RS 400/460/480/520 Jan. 1998.
Hendrickson, Parts List HN 402/462, Sep. 1997.
Hendrickson, Parts List HN Series, Dec. 2004.
Hendrickson Truck Suspension Systems, A Boler Company, Technical Publication RS-340 thru 520, Subject: Springing: Frame Hangers, Load Cushions and Saddle Assembly, Jul. 1993.
Hendrickson Truck Suspension Systems, A Boler Company, Technical Publication HN Series Truck & Trailer Suspension No. 17730-198, Mar. 1993.
Hendrickson, Technical Procedure HN/HNT-400/460 Truck & Trailer Suspension in Production Nov. 1988-Sep. 1996, Apr. 1998.
Hendrickson Truck Suspension Systems, A Boler Company, Technical Publication HN 402 Series, Subject: Service Instructions, Aug. 1996.
Hendrickson Truck Suspension Systems, A Boler Company, Technical Publication HN 402/462 Series, Subject: Service Instructions, Aug. 1998.
Hendrickson, Technical Procedure Haulmaax, Subject: Service Instructions, May 2002.
Hendrickson, Technical Procedure Haulmaax, Subject: Service Instructions, Jun. 2007.
Hendrickson, Technical Procedure Haulmaax, Subject: Pre-delivery Inspection and Preventive Maintenance, Apr. 2006.
Hendrickson, Technical Procedure Haulmaax, Subject: Service Instructions, Dec. 2007.
Hendrickson, Technical Procedure R/RS/RT Heavy Duty, Subject: 650K/850K/1000K Pound Capacity Beam End Connection Tightening Torque Procedure, Jul. 2006.
Hendrickson, RS Series Rubber Load Cushion, Feb. 2000.
MOR/RYDE, The MOR/ryde Steer and Drive Axle Suspension Systems, Mar. 7, 2008.
MOR/RYDE, Company Profile, downloaded from the World Wide Web at http://www.morrydede.com/php/about/profile/php on Feb. 28, 2008.
MOR/RYDE, T/A Modular Rubber Suspension System, Service Manual, Mar. 5, 2003.
MOR/RYDE, Tandem Axle Rubber Suspendion Sytem, Service Manual, Suspension Codes: T01-01 and L01-01, Mar. 5, 2003.
MOR/RYDE, RL Rubber Leaf Suspension System, Owner's Manual, Mar. 12, 2003.
MOR/RYDE, Commercial Trailer Suspension, Jun. 1973.
MOR/RYDE, School Bus Suspension, Aug. 1973.
MOR/RYDE, A rubber spring . . . heart of the Mor/ryde system, Aug. 1973.
Jorn, Technology in Rubber—Metal, Sep. 29, 2008.
Hendrickson, Parts List RS Series, Apr. 2008.
Hendrickson, Technical Procedure, R/RS Heavy Duty, Subject: 85K/100K/120K lbs Capacity Tightening Torgue for Torque Rod and Saddle Assembly Fasteners, Oct. 2008.
U.S. Appl. No. 12/334,195, entitled "Modular Suspension System and Components Thereof" and filed Dec. 12, 2008.
Vincent Ciulla, "Progressive Rate Spring," downloaded from the World Wide Web at http://autorepair.about.com/library/glossary/bldef-227.htm?p=1 on Nov. 11, 2009.
"PT-Tuning," downloaded from the World Wide Web at http://pt-tuning.com/pdfs/suspensionInstall.pdf Score:1, Aug. 11, 2003.
"Progressive Springs—Linear Springs," downloaded from the World Wide Web at http://www.scoobytuner.com/tuning/?tSfID1=16&tuningID=21 on Nov. 11, 2009.
"Hydropneumatic Suspension"—Wikipedia, the free encyclopedia, downloaded from the World Wide Web at http://en.wikipedia.org/wiki/hydropneumatic_suspension on Nov. 11, 2009.
Hendrickson, Technical Procedure, Non-steerable Suspension Systems, Subject: Installation Instructions, LIT. No. H621, Dec. 2003.
Hendrickson, Bus Air Ride Suspensions, No. 45745-123, Oct. 1998.
European Patent Office, International Search Report for International application No. PCT/US2009/056575, Mar. 3, 2010.
European Patent Office, Written Opinion for International application No. PCT/US2009/056575, Mar. 3, 2010.
European Patent Office, Communication Relating to the Results of the Partial International Search, PCT/US2009/036662, Mar. 2, 2010.
European Patent Office, International Search Report for International Application No. PCT/US2009/036662, Feb. 17, 2010.
European Patent Office, Written Opinion of the International Searching Authority for International Application No. PCT/US2009/036662, Feb. 17, 2010.
European Patent Office, International Search Report the International Searching Authority for International Application No. PCT/US2009/056575, Feb. 12, 2010.
European Patent Office, Written Opinion of the International Searching Authority for International Application No. PCT/US2009/056575, Feb. 12, 2010.
About.com, Progressive Rate Spring, downloaded from the World Wide Web at http://autorepair.about.com/library/glossary/bldef-277.htm on Nov. 21, 2008.
Elastomer, downloaded from the World Wide Web at http://en.wikipedia.org/wiki/Elastomer on Nov. 24, 2008.
Hendrickson USA, L.L.C., Technical Procedure R/RS/RT Heavy Duty, Lit. No. 17730-149, Revision C, Jul. 2006.
Paul Mocioche, Rouch Industries, Inc. Viscoelastic Damping 101, Sep. 9, 2002.

* cited by examiner

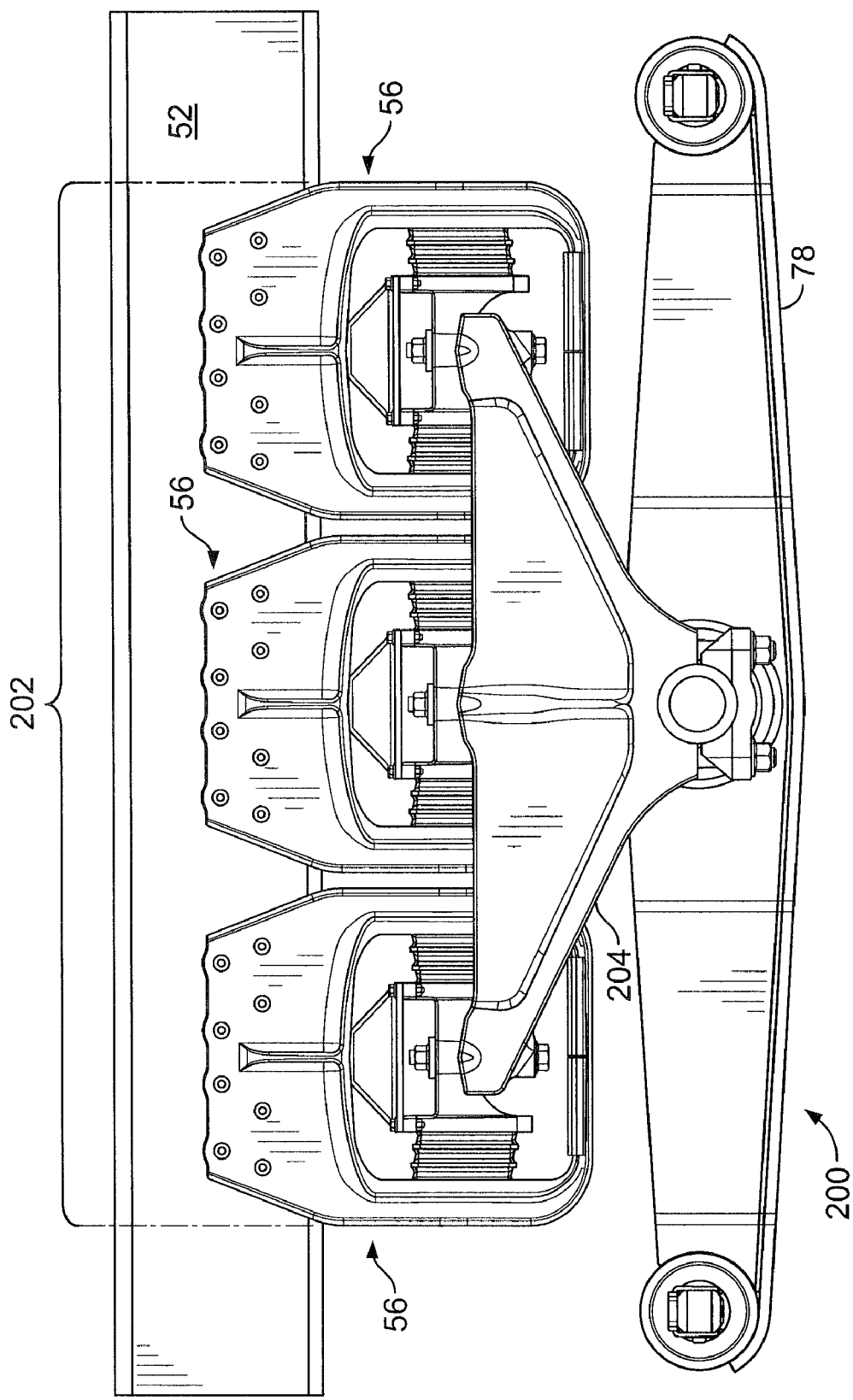

ELASTOMERIC SPRING VEHICLE SUSPENSION

BACKGROUND OF THE INVENTION

The present invention generally relates to vehicle suspensions. More particularly, the present invention relates to elastomeric spring vehicle suspensions for use in vocational or heavy haul truck applications.

Elastomeric spring vehicle suspensions for use in vocational or heavy haul truck applications are known. Such suspensions may be classified as single spring rate suspensions or variable spring rate suspensions.

Single spring rate suspensions have a fixed spring rate that generally must be set at a level that produces a suspension with either a comfortable ride or a stiff suspension exhibiting adequate roll stability. As a result, either roll stability or ride quality is compromised in single spring rate suspensions, depending upon the selected spring rate.

Variable rate suspensions overcome this deficiency of single rate suspensions by providing for multiple spring rates during operation. As the sprung load is increased, the spring rate is correspondingly increased.

An example of a variable spring rate elastomeric spring suspension for use in vocational or heavy haul truck applications is disclosed in U.S. Pat. No. 6,585,286, the disclosure of which is hereby incorporated herein by reference. That suspension utilizes bolster springs and auxiliary springs to achieve its variable spring rate.

The spring rate for such a suspension can change due to the engagement or disengagement of the auxiliary spring as a function of load. The ride quality of a lightly loaded chassis having such a suspension is quite good without sacrificing roll stability at rated chassis load. When a lightly to moderately loaded chassis with such a suspension encounters moderate to large variations in roadway or operating conditions, frequent engagement and disengagement of the auxiliary spring may occur. For each such engagement or disengagement of the auxiliary spring, the spring rate for the system may undergo an abrupt change known as strike-through effect. Ride quality may be compromised as a result. Graphically, the spring rate has a discontinuity at the load where the auxiliary spring is engaged or disengaged and represents a step function.

Prior elastomeric spring suspensions for vocational or heavy haul truck applications require their elastomeric springs to undergo loading that is compressive, tensile and/or shearing in nature. Tensile loading causes elastomeric break down.

In view of the conditions identified above with respect to prior elastomeric spring vehicle suspensions for vocational or heavy haul truck applications, it is desired to develop a new and improved suspension of that type for those applications.

Accordingly, it is desired to develop elastomeric spring vocational suspensions that have a continuously increasing spring rate (curvilinear and with no discontinuities) as a function of load.

It is desired to develop elastomeric spring vocational suspensions that have an almost linearly increasing spring rate as a function of load.

It is desired to develop elastomeric spring vocational suspensions that provide good ride quality on a lightly loaded chassis without sacrificing roll stability at rated chassis load.

It is also desired to develop elastomeric spring vocational suspensions that do not experience any abrupt change in spring rate due to engagement or disengagement of an auxiliary spring as the vehicle encounters moderate to large variations in roadway or operating conditions.

It is further desired to develop elastomeric spring vocational suspensions having springs that do not undergo tensile loading.

It is still further desired to develop elastomeric spring vocational suspensions having no tire chain usage restrictions, as is the case with many elastomeric spring vocational suspensions.

It is also desired to develop elastomeric spring vocational suspensions having minimal interaxle brake load transfer due to the pivot point created at the equalizing beam center bushing.

It is further desired to develop elastomeric spring vocational suspensions having improved articulation by virtue of the pivot point created at the equalizing beam center bushing.

It is still further desired to develop elastomeric spring vocational suspensions having improved durability due to reduced number of fasteners, mechanical joints that reduce the criticality of fastener preloads, and the aforementioned elimination of tensile loading in elastomeric springs.

It is further desired to develop a modular suspension.

Vocational suspensions designed in accordance with the principles of those disclosed herein may achieve these benefits. These and other desired benefits of the preferred forms of the invention will be apparent from the following description. It will be understood, however, that a suspension could still appropriate the claimed invention without accomplishing each and every one of the desired benefits, including those gleaned from the following description. The appended claims, not these desired benefits, define the subject matter of the invention. Any and all benefits are derived from the preferred forms of the invention, not necessarily the invention in general.

SUMMARY OF THE INVENTION

In a preferred embodiment, the present invention is directed to an elastomeric spring vehicle suspension for supporting a longitudinally extending vehicle frame rail above adjacent ends of tandem axles. The suspension includes a frame hanger assembly including first and second frame hanger spring modules mounted to the vehicle frame rail. Each frame hanger spring module has an elastomeric spring system. For each spring system, two elastomeric shear springs are positioned in compression between opposite inner walls of the frame hanger spring module and opposite sides of a spring mount centrally positioned within the spring module. Each of the elastomeric shear springs acts in compression and shear only (neither undergoes tensile loading). In addition, for each spring system an elastomeric load cushion having a continuously increasing spring rate (most preferably having a pyramidal shape) is positioned between the spring mount and a top surface of the spring module.

A suspension saddle is attached to the spring mounts included within the first and second frame hanger assemblies. The saddle is attached to the center bushing of a longitudinally extending equalizing beam, which is connected in known manner to each of the tandem axles.

BRIEF DESCRIPTION OF THE SEVERAL VIEWS OF THE DRAWING

In this written description, reference will be made to the following figures of the drawing, wherein like parts are designated by like reference numerals, and wherein:

FIG. 22 is a side elevational view of another suspension constructed in accordance with the principles disclosed herein;

DETAILED DESCRIPTION OF THE INVENTION

Figure 1:
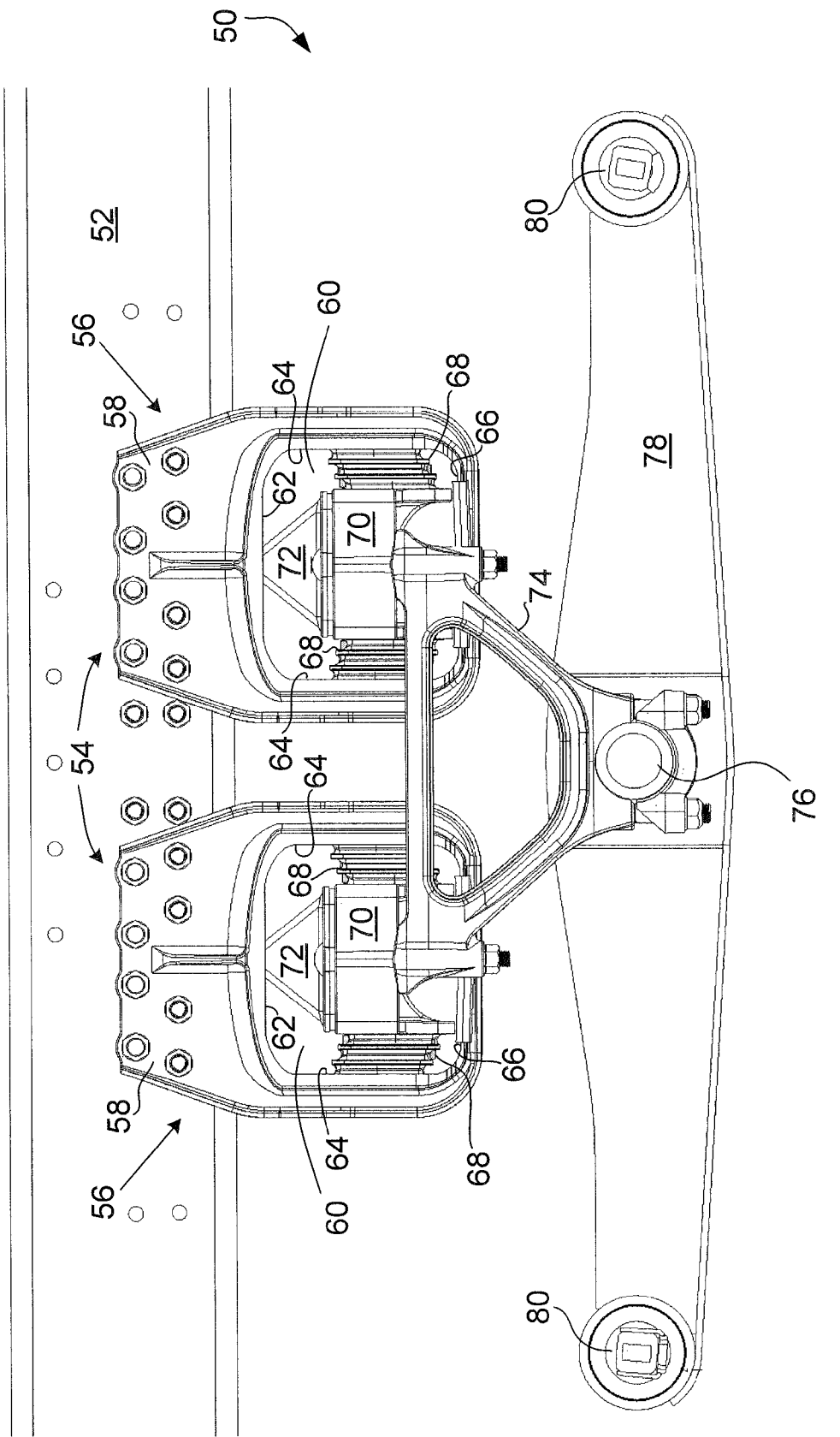
FIG. 1 is a side elevational view of a vehicle suspension constructed in accordance with the principles disclosed herein.

FIGS. 1-21 illustrate a vehicle suspension generally designated 50 and components therefor. The vehicle suspension 50 is designed to support longitudinally extending C-shaped vehicle frame rails 52 above laterally extending vehicle axles (not shown) of a tandem axle configuration for the vehicle. As will be appreciated by those skilled in the art, components for vehicle suspension 50 and the other suspensions described herein are duplicated on each side of the vehicle. It will also be appreciated that vehicle wheels (not shown) are mounted to the ends of the vehicle axles in known manner. Further, it will be appreciated that vehicle frame rails 52 are connected by one or more vehicle frame cross members (not shown).

The suspension 50 includes a frame hanger assembly 54 having two frame hanger spring modules 56 mounted on the adjacent frame rail 52 in known manner. In that regard, each spring module 56 includes a frame attachment portion 58 having frame attachment holes for attachment of the spring module to the adjacent frame rail 52.

Each frame hanger spring module 56 includes a window-like opening 60 defined by top wall 62, side walls 64 and bottom wall 66. Within each opening 60, two shear springs 68 are positioned in compression between the side walls 64 and a spring mount 70 centrally positioned within the opening. Shear springs 68 are preferably in compression on the order of 13,000 pounds of load. In addition, within each opening 60, an elastomeric progressive spring rate load cushion 72 having a continuously increasing spring rate is positioned between spring mount 70 and the top wall 62 of the opening 60.

It will be appreciated herein throughout that while spring modules 56 are described as having shear springs 68 and progressive spring rate load cushions 72, if the load has a sufficiently small magnitude in the fully loaded state, a spring module having only the shear springs (i.e., not having a progressive spring rate load cushion) may suffice.

Figure 3:
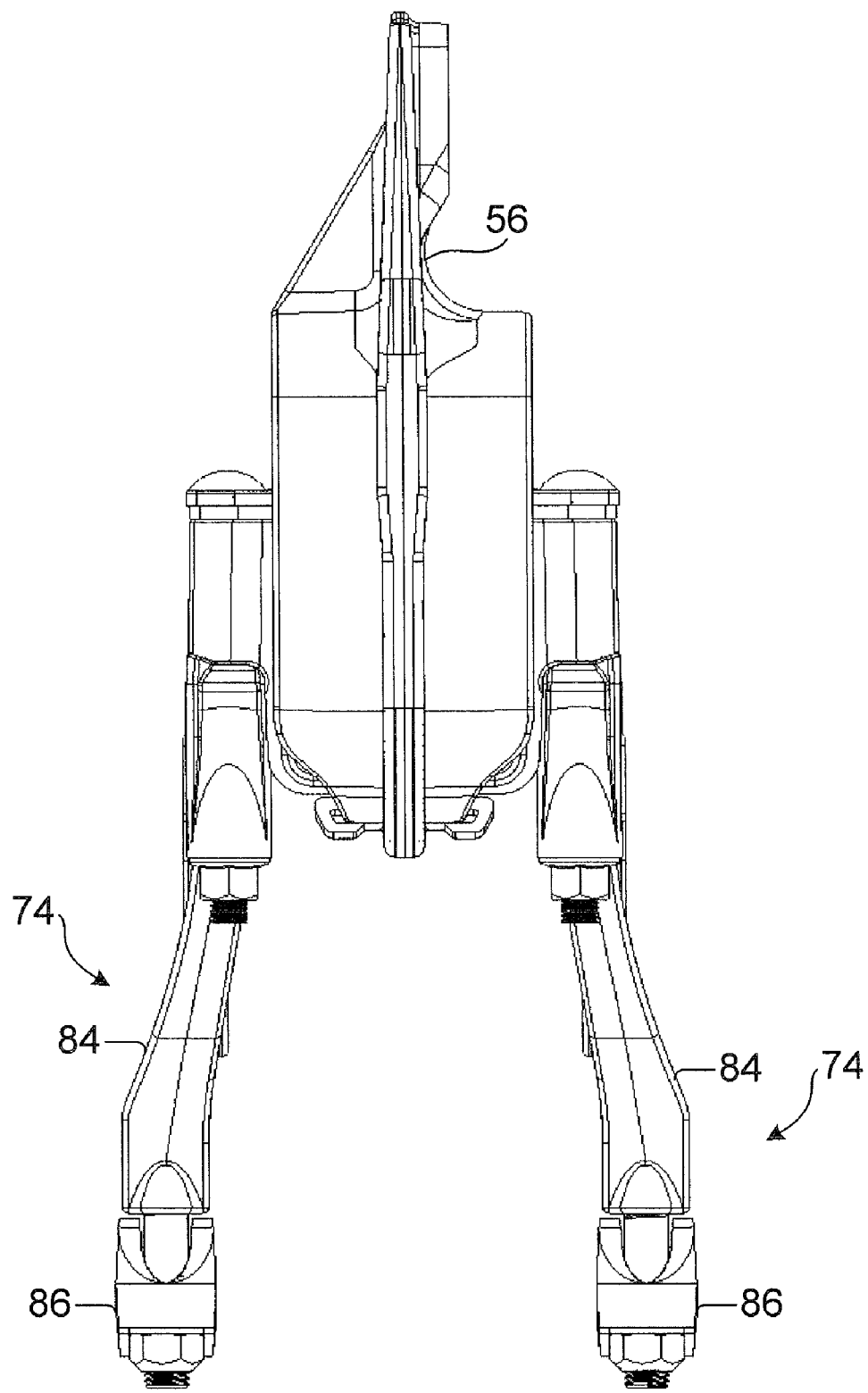
FIG. 3 is an end view of the frame hanger assembly and the saddle assembly illustrated in FIG. 2.

Two suspension saddle assemblies 74 are attached to the spring mounts 70 included within each opening 60. One saddle assembly 74 is positioned on the outboard side of the frame hanger spring modules 56, as shown in FIG. 3. The other saddle assembly 74 is positioned on the opposite (inboard) side of frame hanger spring modules 56, as also shown in FIG. 3. The saddle assemblies 74 are attached to the center bushing 76 of a longitudinally extending fabricated equalizing beam 78, also known in the art as a walking beam.

Each beam 78 includes bushing tubes or canisters 80 positioned on opposite ends thereof. Each end of beam 78 is connected to a respective end of the vehicle axles (not shown) in known manner.

Figure 2:
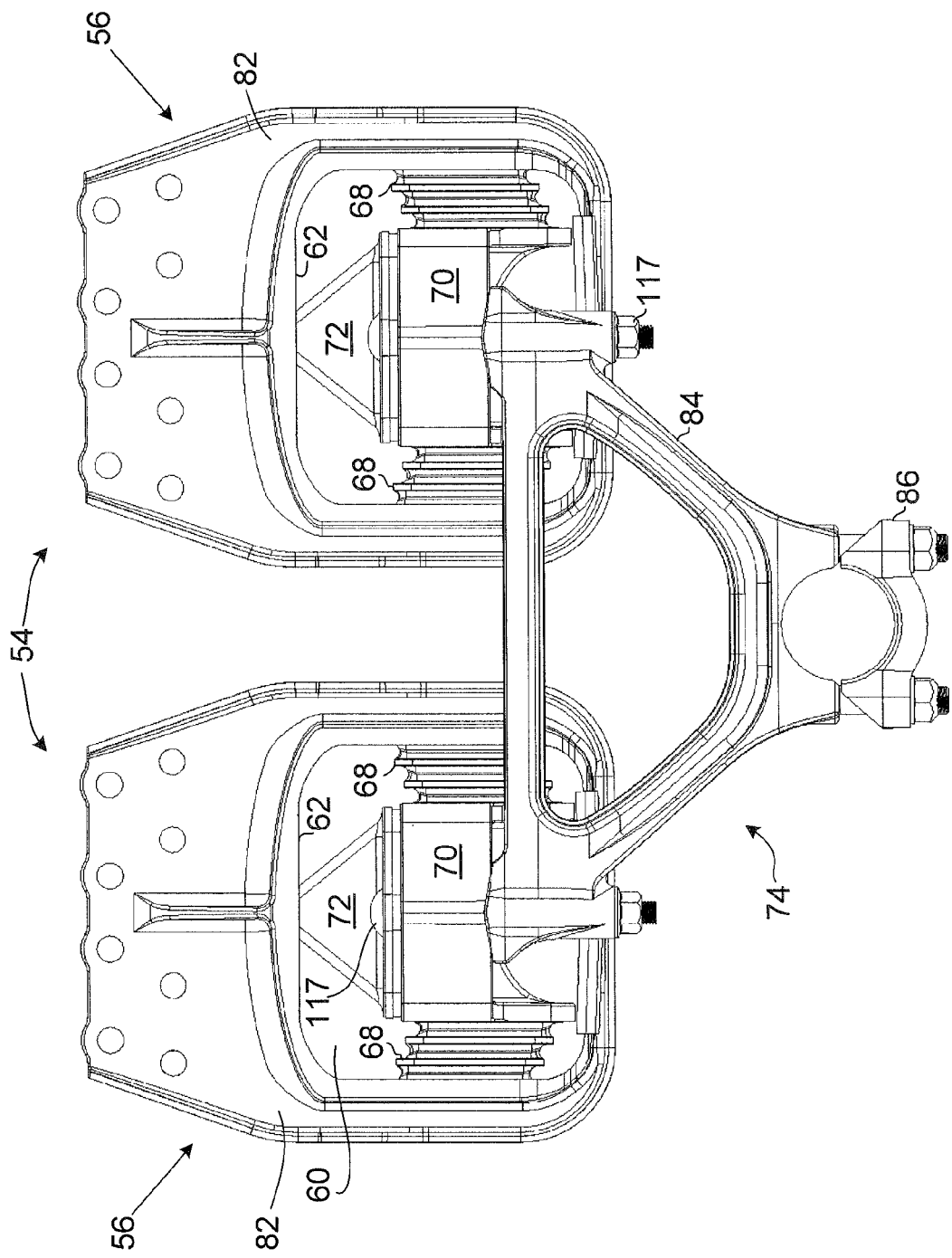
FIG. 2 is a side elevational view of a frame hanger assembly and a saddle assembly illustrated in FIG. 1.

FIGS. 2 and 3 illustrate the frame hanger assembly 54 and the saddle assembly 74. Frame hanger assembly 54 includes the two frame hanger spring modules 56. Each spring module 56 includes a frame hanger 82, two shear springs 68, a progressive spring rate load cushion 72, and a spring mount 70. Each saddle assembly 74 includes a saddle portion 84 and a split cap end portion 86. The saddle portion 84 of each saddle assembly 74 is connected to the spring mounts 70, which provide mounting surfaces for the shear springs 68 and the progressive spring rate load cushions 72.

The shear springs 68 are permanently held in compression between the spring mounts 70 and the side walls 64 defining the sides of the openings 60 of the frame hanger spring modules 56, preferably under approximately 13,000 pounds of load (see FIG. 1). The shear springs 68 do not undergo tensile loading, which increases their fatigue life compared to elastomer springs that are subjected to such loading. The shear springs 68 are also oriented generally sideways, as illustrated, such that they act in shear and thereby have improved performance.

The progressive spring rate load cushions 72 are mounted between the spring mounts 70 and the respective top walls 62 of the openings 60. The load cushions 72 have a continuously increasing spring rate during loading. Accordingly, the elastomer spring suspension 50 has a continuously increasing spring rate during loading. The load cushions 72 also act in compression and do not undergo tensile loading, so they also have increased fatigue life over elastomer springs subjected to such loading.

Figure 4:
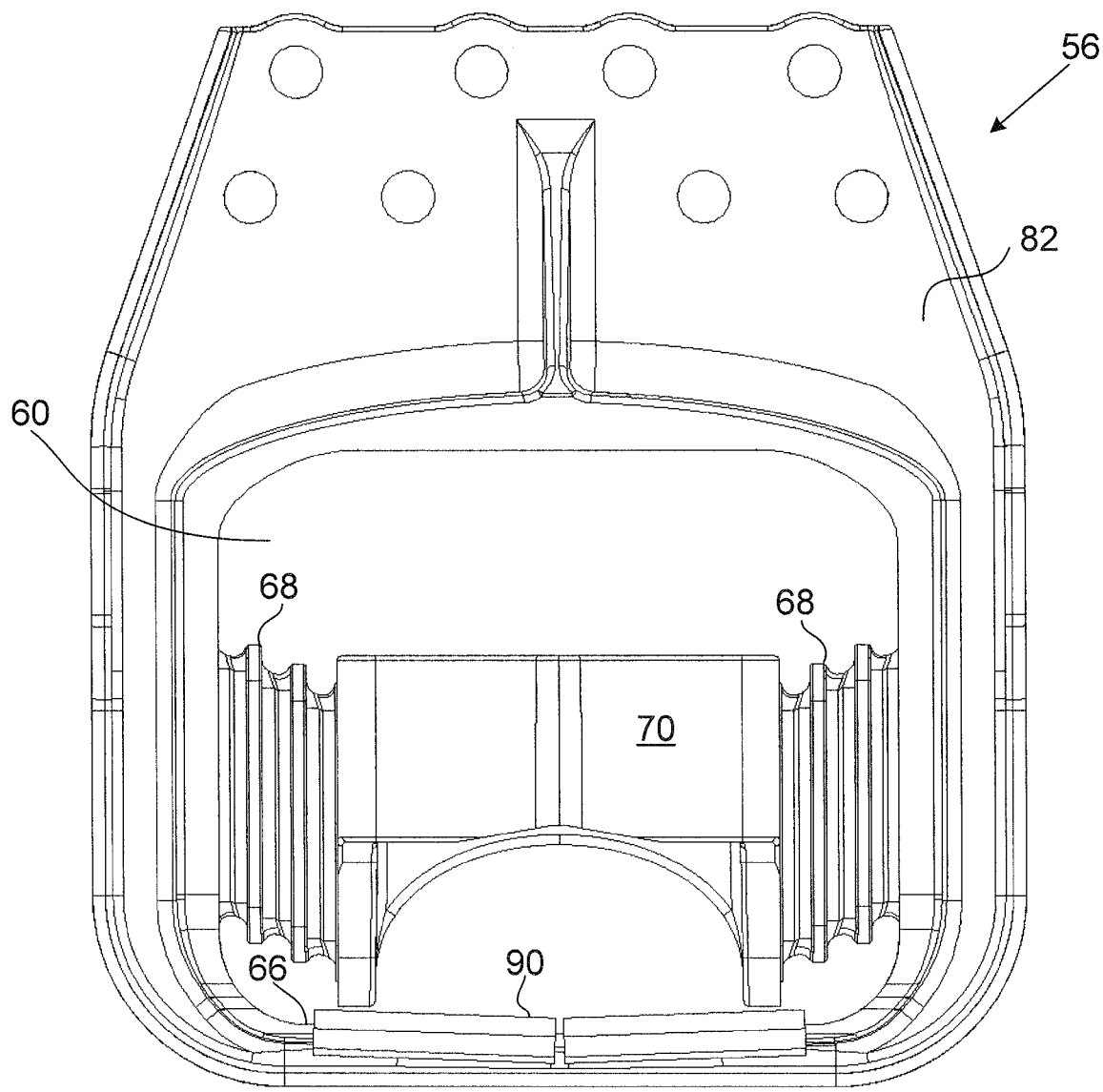
FIG. 4 is a side elevational view of a frame hanger spring module illustrated in FIG. 1.
Figure 5:
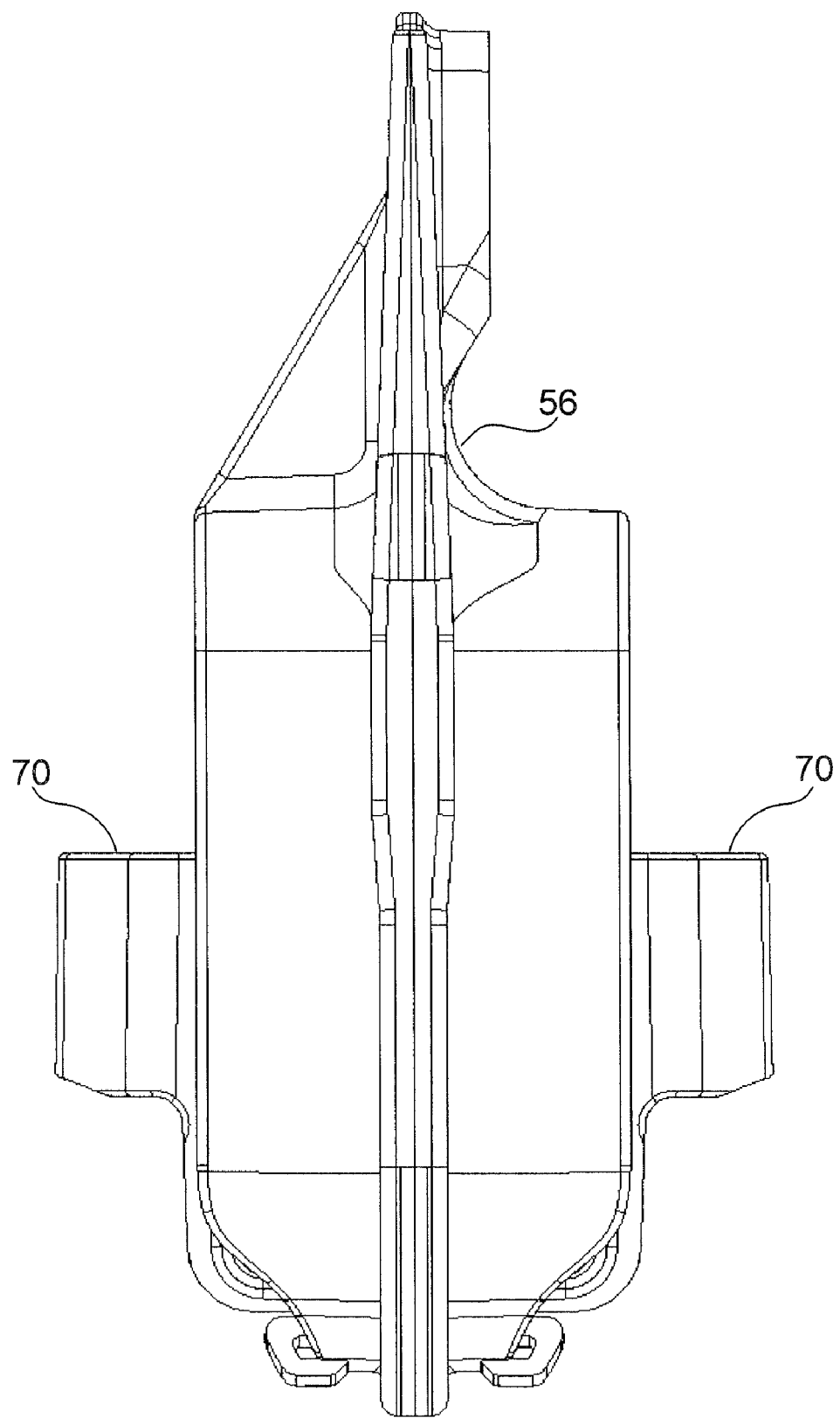
FIG. 5 is an end view of the frame hanger spring module illustrated in FIG. 4.

FIGS. 4 and 5 illustrate a full frame hanger spring module 56. Each full frame hanger spring module 56 includes a frame hanger 82, a spring mount 70, two shear springs 68 and an elastomeric progressive spring rate load cushion 72 (see FIG. 2). Each spring mount 70 includes two saddle mounting bores 114 (see FIGS. 12-15) that are positioned inboard and outboard, respectively, of the frame hanger 82 to permit the saddle assembly 74 to be attached (see also FIGS. 2 and 3).

The bottom wall 66 of the opening 60 constitutes a rebound stop for suspension 50. This integrated rebound control eliminates the need for ancillary devices for such purpose. A snubber 90 may be included and attached to the bottom wall 66 of the opening 60, as shown, to further reduce audible noise that may be generated when the suspension goes into rebound.

Figure 6:
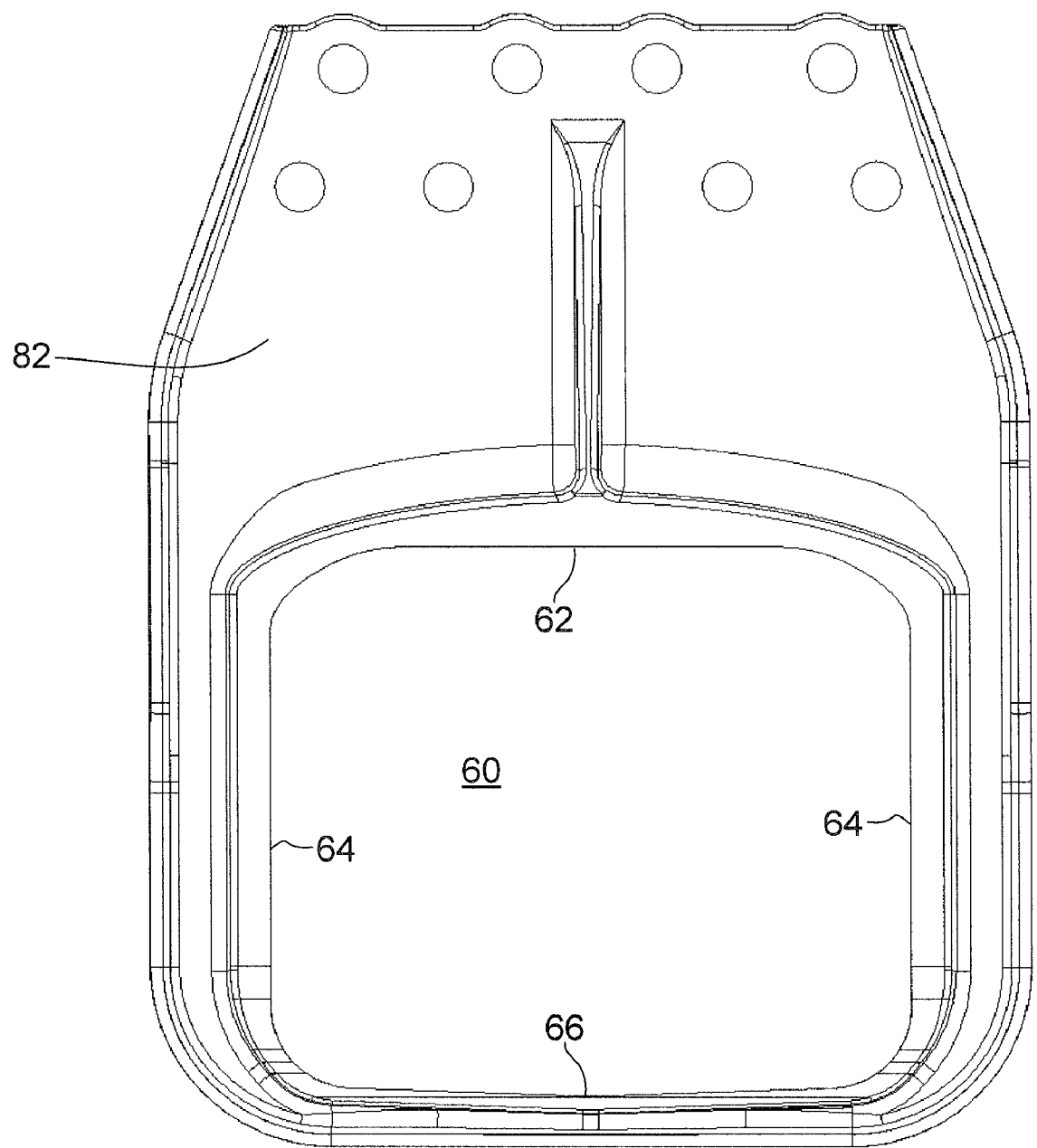
FIG. 6 is a side elevational view of a frame hanger illustrated in FIG. 1.
Figure 7:
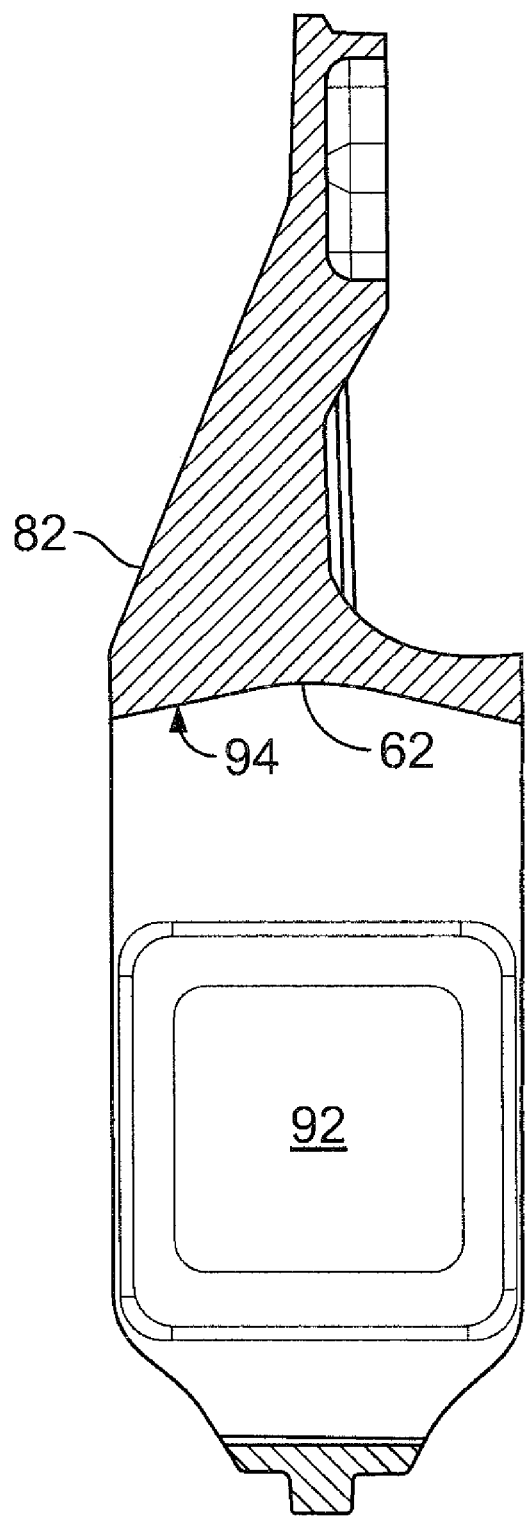
FIG. 7 is a sectional view of the frame hanger illustrated in FIG. 6, taken along lines 7-7 thereof.

FIGS. 6 and 7 illustrate frame hanger 82, showing that it includes pockets 92 having height and width dimensions preferably optimized for locating the associated shear spring 68. The frame hanger pockets 92 eliminate the need for fasteners to retain shear springs 68. The width of the frame hanger opening 60, and hence the span between pockets 92, is also preferably optimized for compression of the shear springs 68 in assembly. Further, the depth of pockets 92 is also optimized for clearance of the shear springs in operation as the shear springs move through their full stroke. Pocket depth optimization also provides secondary vertical and horizontal retention of the shear springs in addition to the retention provided by the compression of the shear springs and by the coefficient of friction between the shear springs and the mating member. With the preferred dimensions, no fasteners are required to retain the shear springs 68 in assembly, although embodiments that do require fasteners are also within the scope of the subject matter disclosed herein.

The top wall 62 for each opening 60 uses two elliptical shapes in perpendicular planes to form a dome-like configuration 94 that controls bulging of the elastomeric progressive spring rate load cushion 72 during loaded conditions, thereby increasing the useful life of the load cushion. This dome-like configuration 94 also eliminates potential sharp edges that could damage the load cushion.

Each frame hanger 82 also preferably has a symmetrical design, as shown. This permits each frame hanger 82 to be positioned on either side of the vehicle. Each frame hanger 82 also preferably has a frame bolt pattern that has been optimized for retention of the frame hanger to its associated vehicle frame rail under all operating conditions.

Figure 8:
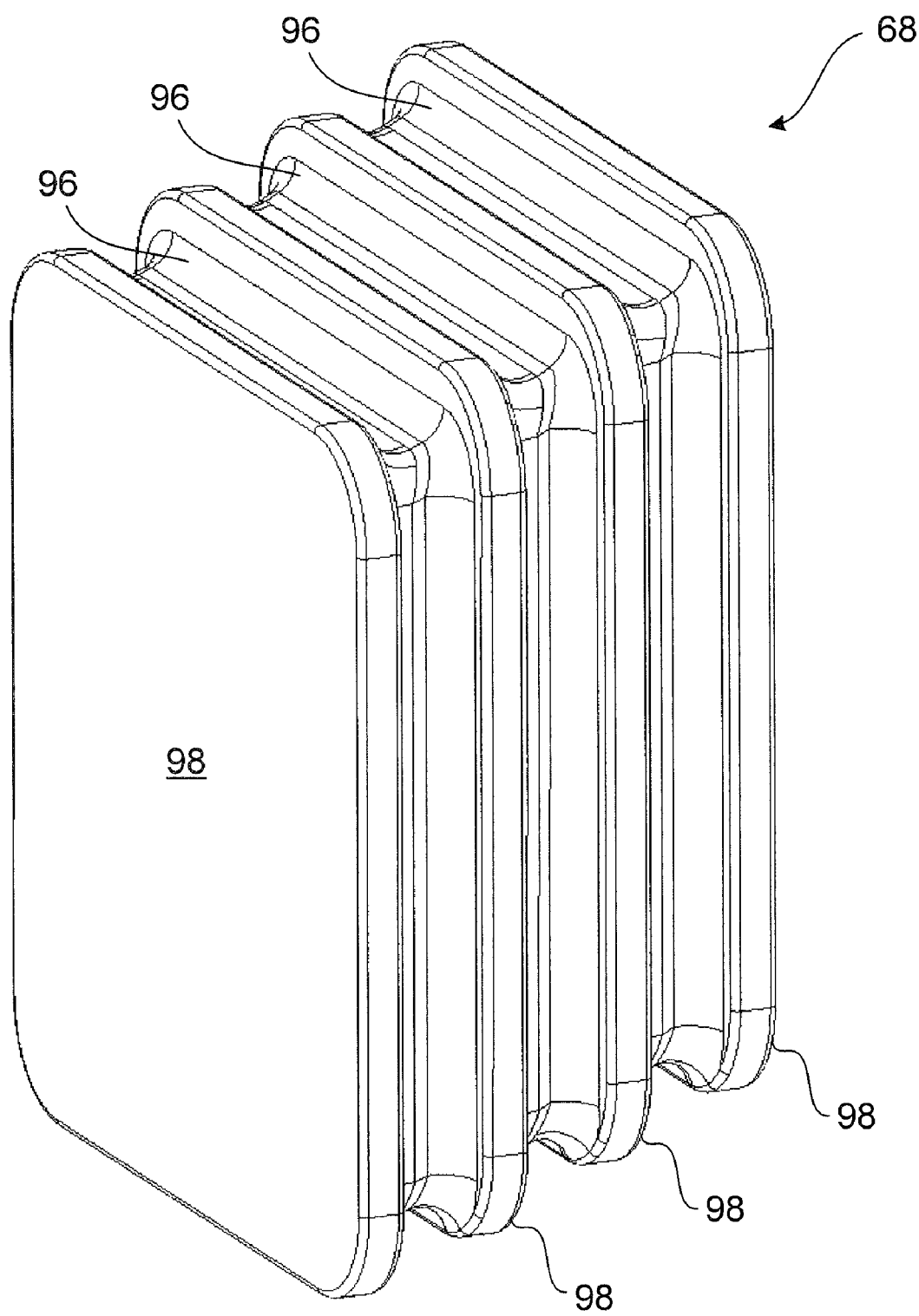
FIG. 8 is a perspective view of an elastomeric shear spring illustrated in FIG. 1.

FIG. 8 illustrates elastomeric shear spring 68. Each shear spring 68 is constructed of elastomeric load blocks 96 bonded to plates 98.

As explained above, the shear springs 68 are mounted in compression due to the compressive load provided by mounting them between spring pockets 92 in the side walls 64 of the spring module 56 and pockets formed in the spring mount 70. The shear springs 68 contribute to the vertical spring rate of suspension 50 through their shear spring rate. This vertical spring rate is constant over the entire range of motion for suspension 50. The vertical spring rate can be customized for any given shear spring geometry by using an elastomer with a different durometer rating.

The compressive spring rate for shear springs 68 is preferably designed to be constant over a small range of compression, to aid in assembly, and to be asymptotic in the as-installed condition, to keep suspension travel due to shear spring compression during acceleration or deceleration to a minimum, preferably under five millimeters.

Each of the plates 98 for shear spring 68 has no effect on the shear spring rate thereof. The plates 98 are used for optimization of the compressive characteristics of the shear springs 68. The plates 98 can be made of a variety of suitable materials, including, but not limited to, iron, steel, aluminum or a composite material. The plate dimensions can be varied to any dimension or shape desired for packaging, weight, aesthetics and locating the shear springs 68 in the hanger and spring mount pockets. The plates 98 may be preferably fully encapsulated in elastomer, as shown, to further enhance their corrosion resistance and friction at the mating suspension members.

Figure 9:
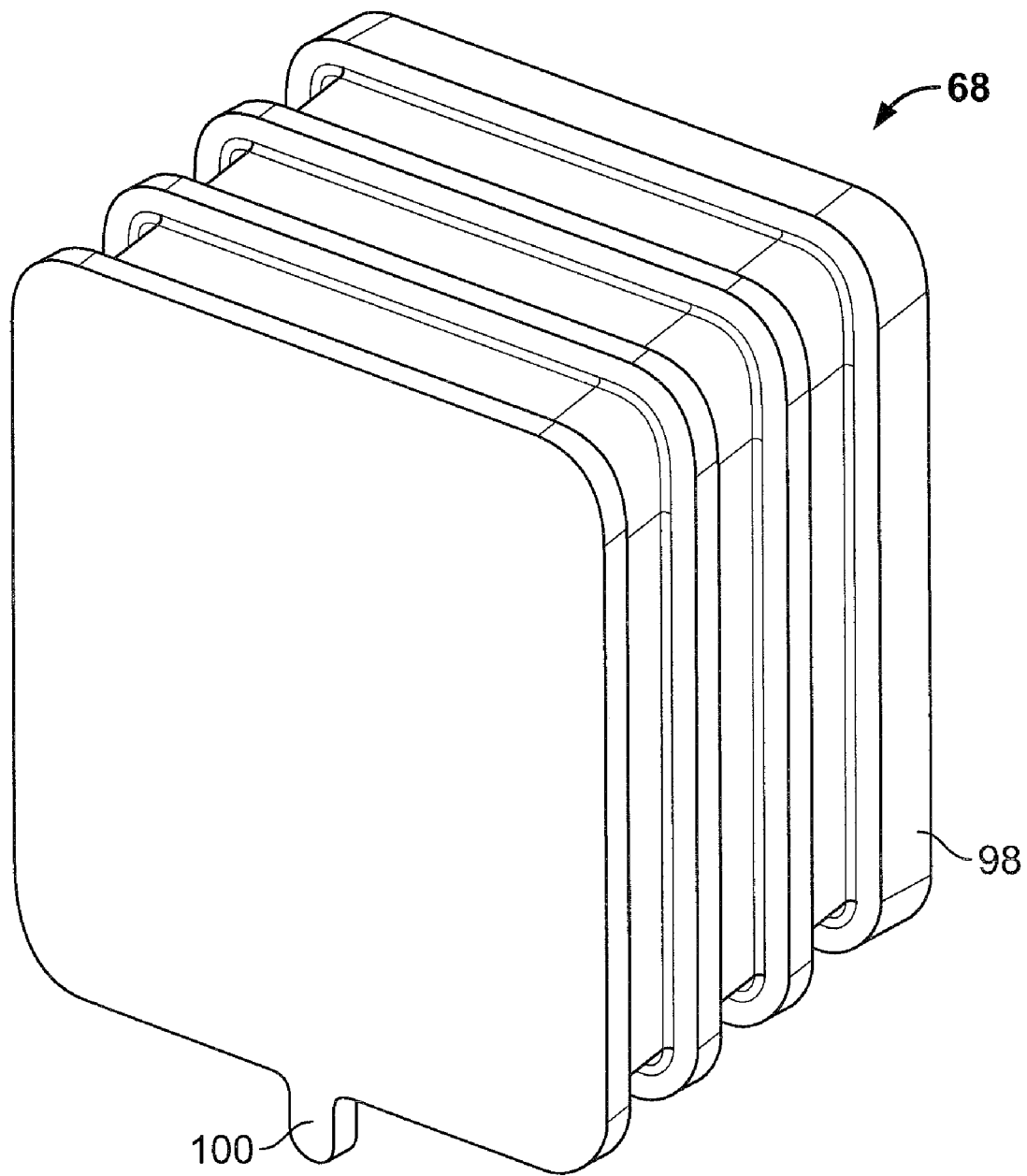
FIG. 9 is a perspective view of another embodiment of an elastomeric shear spring.

FIG. 9 illustrates a shear spring 68 having an optional tab 100 incorporated into the periphery thereof. The tab 100 ensures proper shear spring orientation during assembly. It will be appreciated that any such tabs, if used, can by any shape, size or count.

Figure 10:
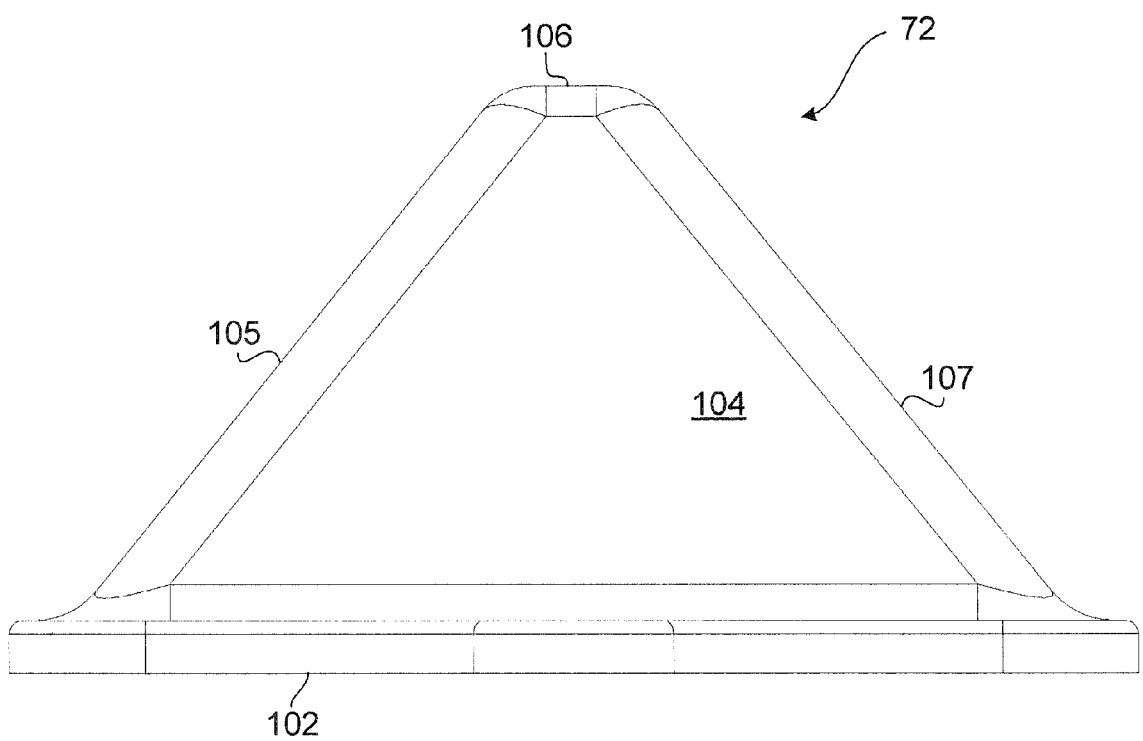
FIG. 10 is an elevational view of an elastomeric progressive spring rate load cushion illustrated in FIG. 1.

FIG. 10 illustrates the elastomeric progressive spring rate load cushion 72 retained by fasteners and positioned between the spring mount 70 and the preferred dome-like configuration 94 formed by the top wall 62 of the frame hanger opening 60. Each progressive spring rate load cushion 72 is designed to have a generally tapering vertical cross section with generally similarly shaped horizontal cross sections of different sizes throughout. In particular, each horizontal cross section has a generally similar shape as other horizontal cross sections, but it does not have the same size or sectional area as other horizontal cross sections. The size change factor, or ratio of similitude, is a function of the taper. The horizontal cross sections can be any geometric shape desired for packaging, weight or aesthetics.

The preferred form of the progressive spring rate load cushion 72 is illustrated in FIG. 10 as having a base plate 102 and an elastomer 104 shaped to resemble a pyramid with a flattened top surface 106. The base plate 102 can be made of a variety of suitable materials, including, but not limited to, iron, steel, aluminum or a composite material. The base plate dimensions can be varied to any dimension or shape desired for packaging, weight, and aesthetics. Preferably, the base plate 102 is dimensioned to match the spring mount top, locate the fasteners securing it to spring mount 70, and minimize overall mass.

The size and dimensions of elastomer 104 for the progressive spring rate load cushion 72 is optimized for the vertical spring rate requirements. The vertical spring rate for the progressive spring rate load cushion 72 continuously increases with increasing load, defining a curvilinear shape with no discontinuities on a graph illustrating spring rate as a function of sprung load.

The preferred progressive spring rate load cushion 72 has a shape closely resembling a pyramid with a flattened top surface 106, as indicated. With this preferred shape, the vertical spring rate for the progressive spring rate load cushion 72 linearly increases with increasing load. In one embodiment, the cross section of the base thereof is 5 inches by 6 inches, the cross section of the top surface 106 thereof is 0.8 inches by 0.8 inches and the height is 3.2 inches. As noted, this construction is pyramidal in shape. The spring rate of the progressive spring rate load cushion 72 may be optimized by varying the durometer of the elastomer 104. With this characteristic, a family of interchangeable progressive spring rate load cushions can be created.

Figure 11:
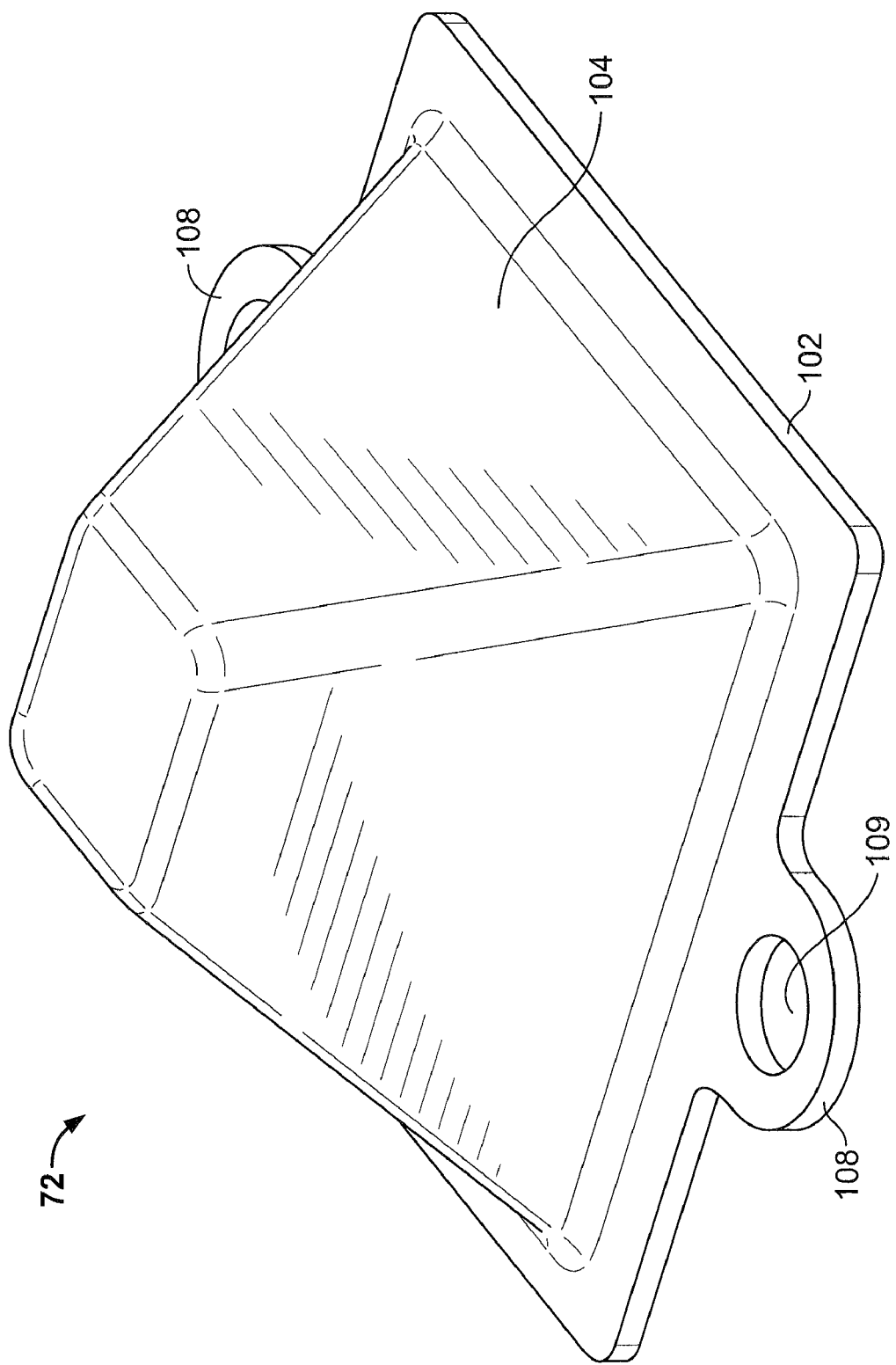
FIG. 11 is a perspective view of another embodiment of an elastomeric progressive spring rate load cushion.
Figure 12:
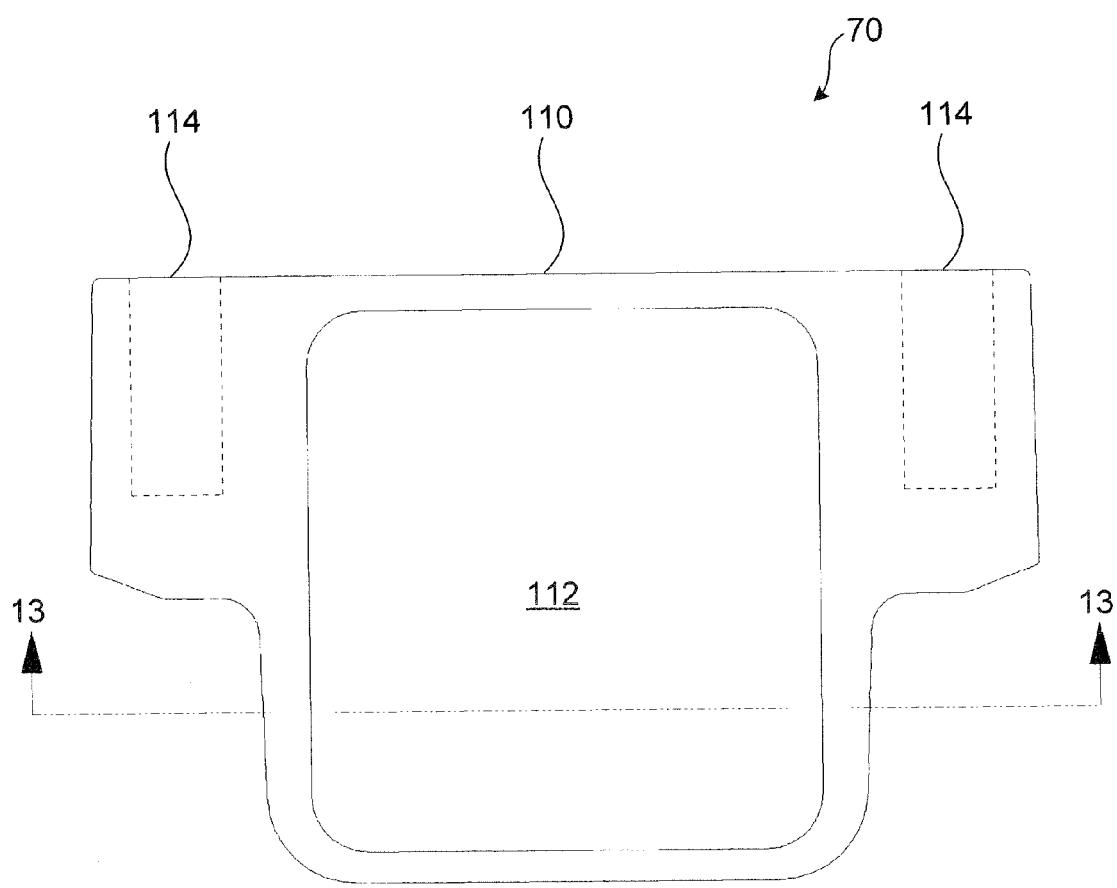
FIG. 12 is a side elevational view of a spring mount illustrated in FIG. 1.
Figure 13:
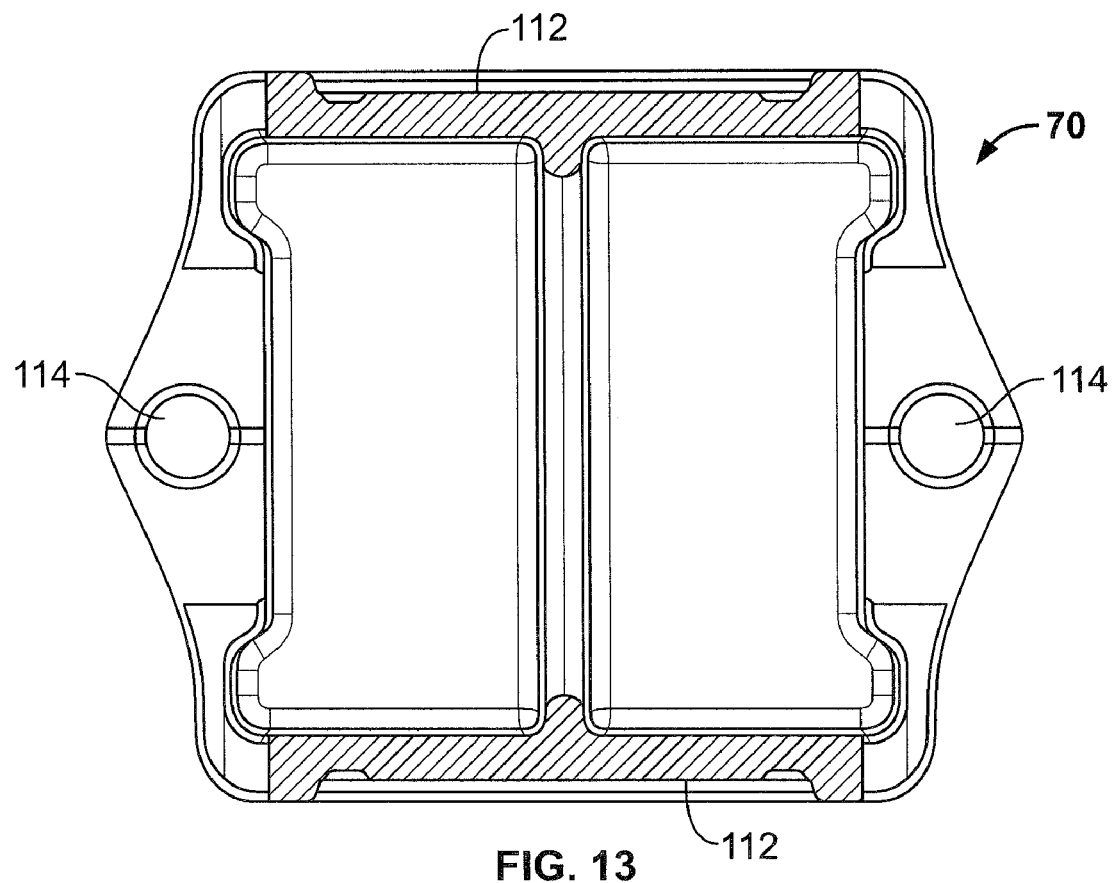
FIG. 13 is a sectional view of the spring mount illustrated in FIG. 12, taken along lines 13-13 thereof.
Figure 15:
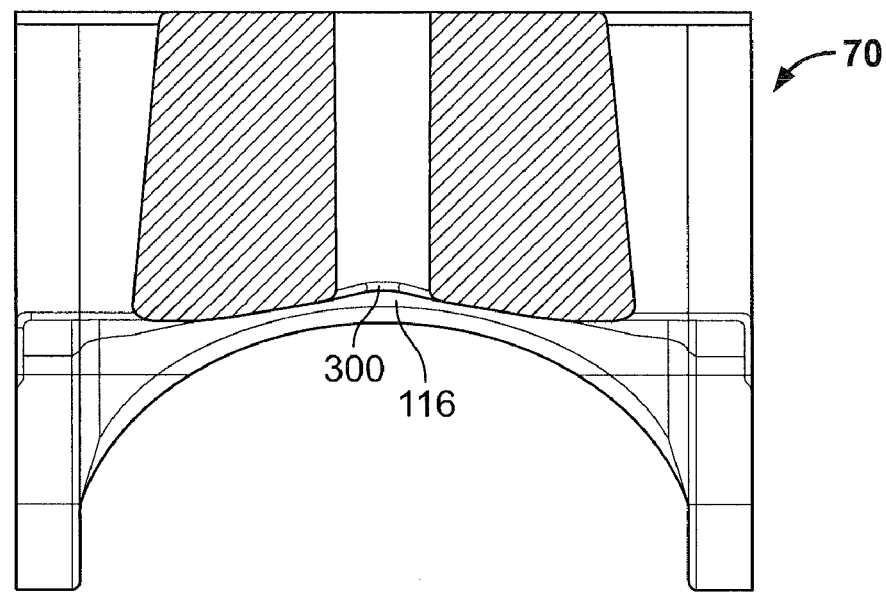
FIG. 15 is a sectional view of the spring mount illustrated in FIG. 14, taken along lines 15-15 thereof.
Figure 14:
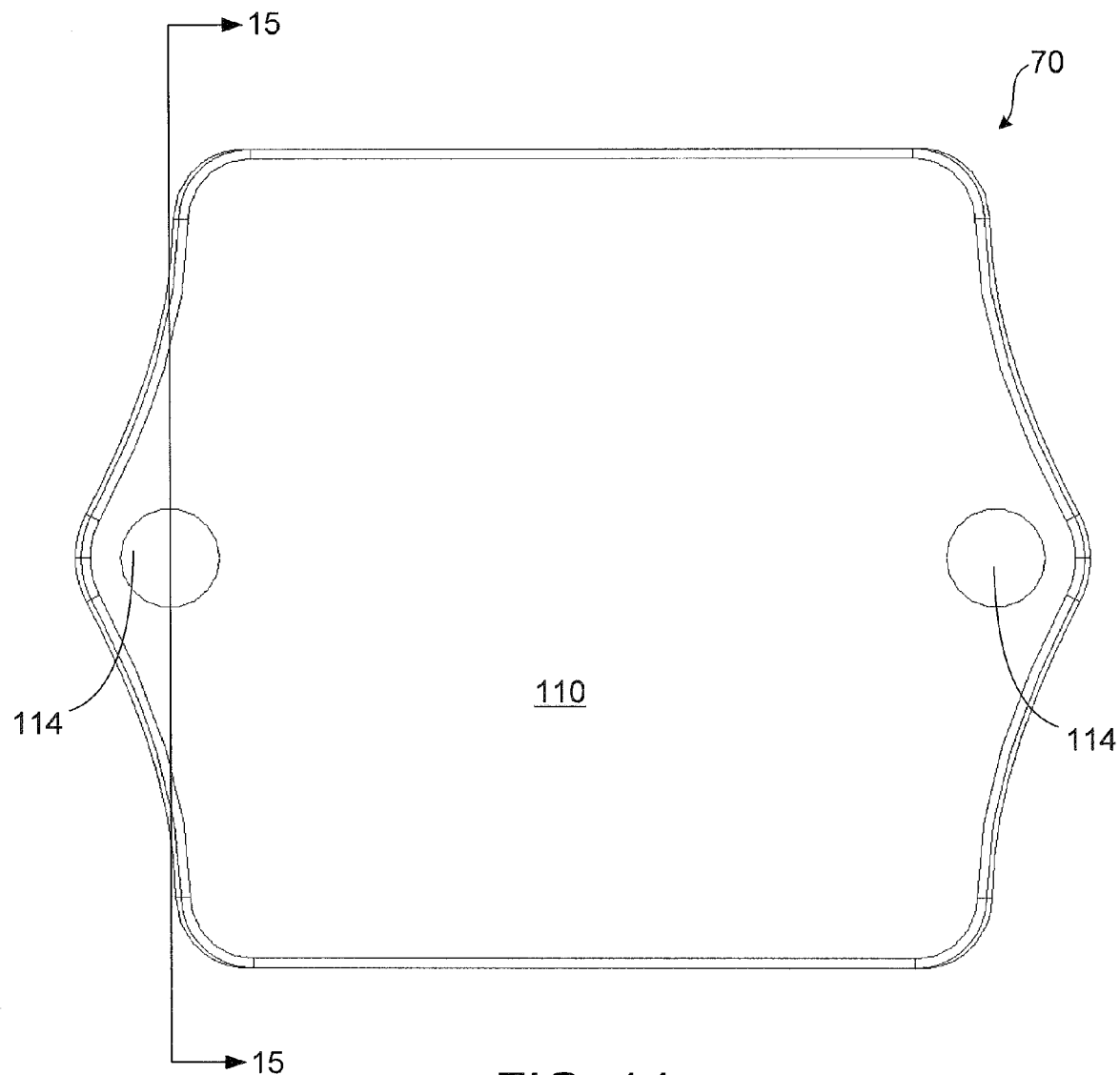
FIG. 14 is a top plan view of the spring mount illustrated in FIG. 12.
Figure 16:
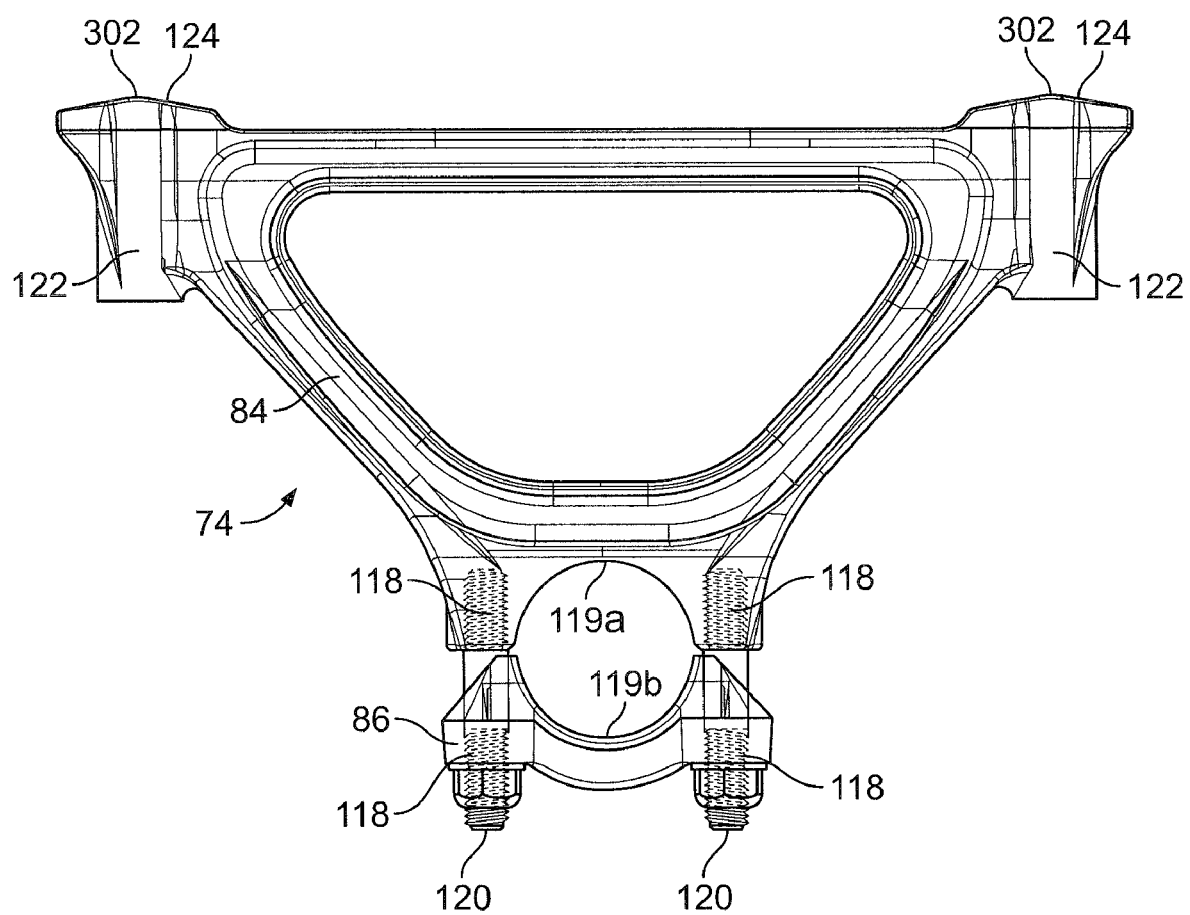
FIG. 16 is a side elevational view of the saddle assembly illustrated in FIG. 1.
Figure 17:
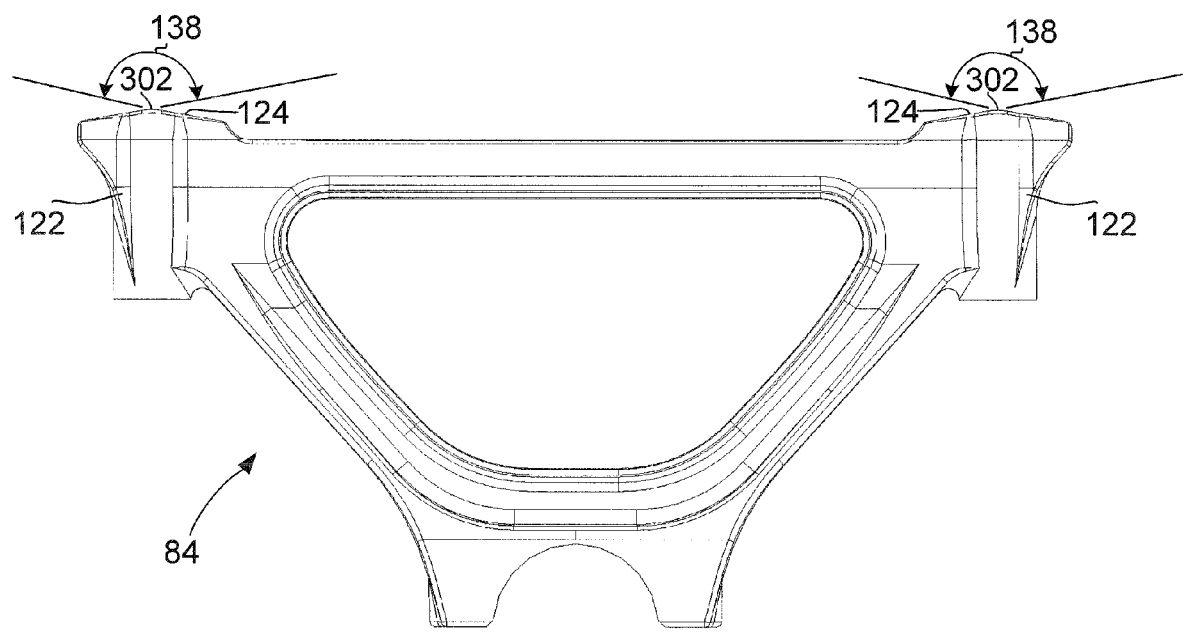
FIG. 17 is a side elevational view of the saddle portion of the saddle assembly illustrated in FIG. 16.
Figure 18:
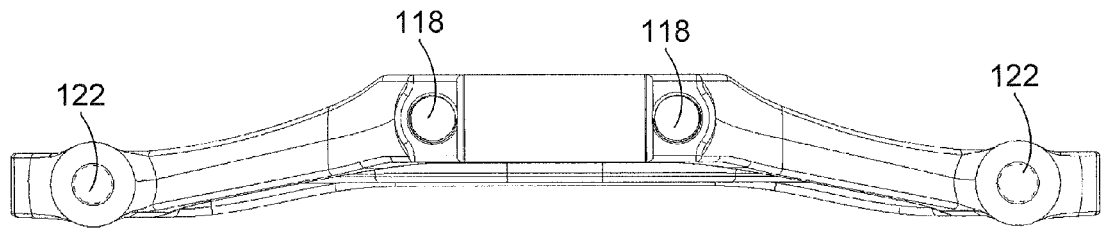
FIG. 18 is a bottom plan view of the saddle illustrated in FIG. 17.

FIG. 11 illustrates an elastomeric progressive spring rate load cushion 72 having its base plate 102 fully encapsulated in the elastomer 104 for greater corrosion resistance and to provide friction at the spring mount interface. The load cushion 72 also has ears 108 incorporated into the base plate 102 providing retention to the spring mount 70.

FIGS. 12-15 illustrate the spring mount 70 included within each spring module 56. Each spring mount 70 includes a generally flat top surface 110 upon which the elastomeric progressive spring rate load cushion 72 is seated, a pair of pockets 112 positioned on opposite sides thereof for accommodating the shear springs 68, and a pair of saddle mounting bores 114 positioned on opposite sides thereof forming saddle interfaces and permitting attachment to the suspension saddles 84.

The oppositely positioned pockets 112 are preferably dimensioned for locating the shear springs 68 in assembly. The horizontal span separating the pockets 112, provided by the dimensions of the spring mount 70, is also optimized for desired compression of the shear springs 68 in assembly. In addition, the depth of the pockets 112 may be optimized for clearance of the shear springs in operation as the shear springs move through their full stroke. Pocket depth optimization also provides secondary vertical and horizontal retention of the shear springs in addition to the retention provided by the compression of the shear springs and by the coefficient of friction between the shear springs and the mating member. With the preferred dimensions, no fasteners are required to retain the shear springs 68 in assembly, although embodiments that do require fasteners are also within the scope of the subject matter disclosed herein.

The saddle interface for spring mount 70 forms the female portion 116 of a spring mount-saddle mechanical joint having a desired angle, preferably about 160 degrees, for maintaining joint integrity in all operating conditions. The spring mount-saddle interface mechanical joint eliminates direct shear loading of the fasteners 117 (see FIG. 2), since the shear loading is borne exclusively by the joint. The spring mount-saddle interface mechanical joint reduces the criticality of fastener preload and minimizes the number of fasteners required. A round head and square neck bolt known in the art as a carriage bolt, is a preferred fastener used for the spring mount-saddle interface.

A spring mount fillet 300 is preferably included at the apex of the saddle interface for spring mount 70 to minimize stress concentrations. The spring mount fillet 300 may be twenty millimeters in length. The spring mount fillet 300 prevents intimate contact at the peak of the saddle interface for spring mount 70 when the saddle 84 is fastened thereto. The fillet 300 also ensures that the only active surfaces for the mechanical joint are the inclined planes of the joint. This has the additional benefit that required tolerances are eased and as-cast surfaces may be used to construct the joint.

FIGS. 16-19 illustrate the saddle assembly 74 included within the suspension. As explained, the saddle assembly 74 includes a saddle portion 84 and a split cap end portion 86. One half bore 119*a* is formed in the center hub interface of the saddle portion 84 to form the upper half of the split cap arrangement, and the other half bore 119*b* is formed in the split cap end portion 86 to form the lower half of the split cap arrangement. Due to relaxed tolerances for this split cap arrangement, saddle assembly 74, including saddle portion 84 and split cap end portion 86, may be assembled as cast. This construction provides for a split cap interface with the attached equalizing beam or other vehicle component and is known in the art. Split cap bores 118 are machined into both parts 84, 86 so that fasteners 120 shown in the form of studs and nuts (see FIG. 16) may secure the saddle portion 84 and the split cap end portion 86 together when the saddle assembly 74 is attached to an equalizing beam 78 or other component.

The saddle 84 preferably has a space frame/truss-like geometry or construction, as illustrated, to minimize component stress during suspension operating conditions and to minimize component mass. The saddle 84 further has spring mount mounting bores 122 for alignment with the saddle mounting bores 114 of the spring mount 70. The saddle 84 includes a male portion 124 for the preferred spring mount interface thereof, designed to be received within the counterpart female portion 116 of the spring mount-saddle interface mechanical joint. The male portion 124 of the mechanical joint also preferably spans 160 degrees.

A saddle round 302 is preferably included at the apex of the spring mount interface for saddle 84 to minimize stress concentrations. The saddle round 302 may be longer than spring mount fillet 300. In a preferred case, saddle round 302 is ten millimeters in length longer then spring mount fillet 300 so that in the case where the spring mount fillet is twenty millimeters in length, the saddle round is thirty millimeters in length. The saddle round 302 prevents intimate contact at the peak of the spring mount interface for saddle 84 when the spring mount 70 is fastened thereto. The saddle round 302 also ensures that the only active surfaces for the mechanical joint are the inclined planes of the joint. This has the additional benefit that required tolerances are eased and as-cast surfaces for the saddle and the spring mount may be used to construct the joint.

Figure 20:
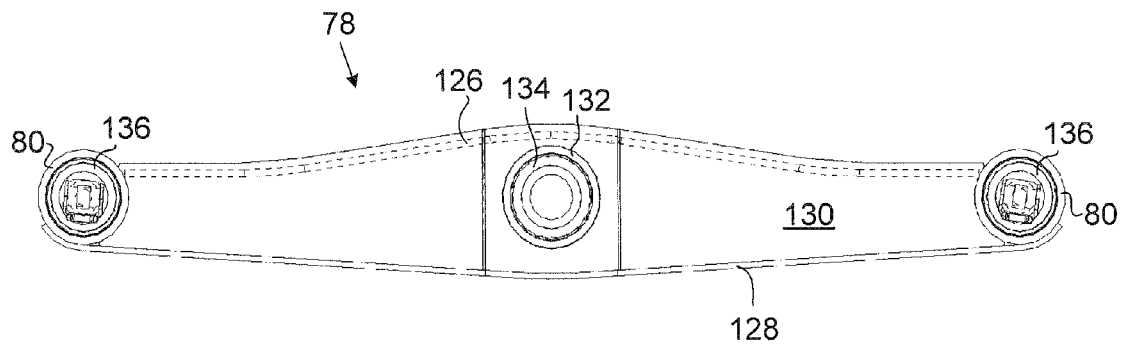
FIG. 20 is a side elevational view of a fabricated equalizing beam illustrated in FIG. 1.
Figure 21:
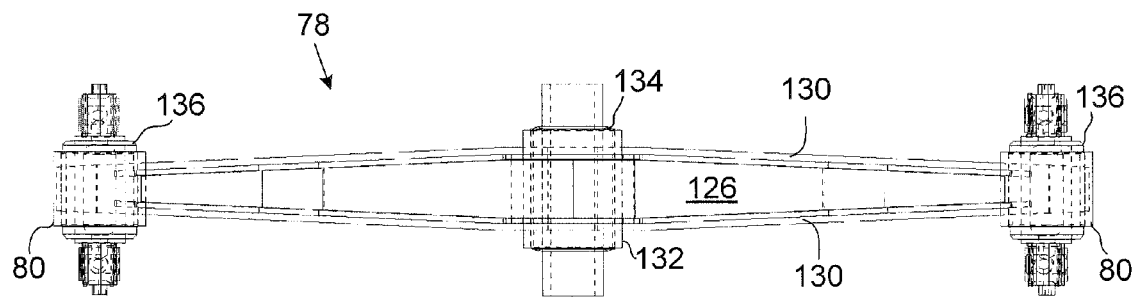
FIG. 21 is a top plan view of the fabricated equalizing beam illustrated in FIG. 20.
Figure 19:
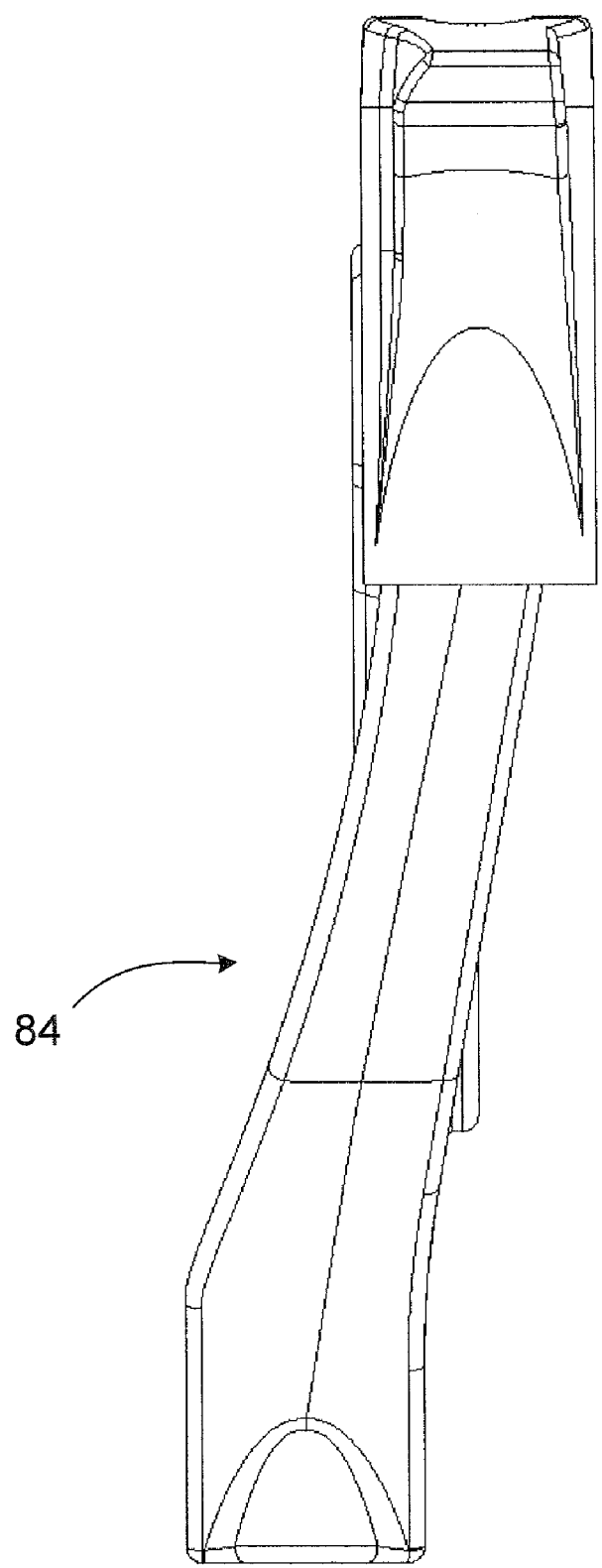
FIG. 19 is an end view of the saddle illustrated in FIG. 17.

FIGS. 20-21 illustrate the equalizing beam 78 (also referred to as a walking beam) used in the illustrated suspension 50. The equalizing beam 78 is preferably a fabricated component having a top plate 126, a bottom plate 128, side plates 130, and two bushing tubes or canisters 80. Center bushing bores 132 are included in a central portion of the side plates 130 to retain a center bushing 134 mounted therein for connection to the saddle assembly 74. Additional bushings 136 are retained in the bushing tubes or canisters 80 for connection to the tandem axles (not shown) in known manner.

The use of the equalizing beam 78 results in minimal interaxle brake load transfer due to the pivot point created at the equalizing beam center bushing 134. The use of the equalizing beam 78 also improves articulation by virtue of the pivot point created at the equalizing beam center bushing 134.

The suspensions described herein are modular. As one example, the vehicle ride height may be set, as desired. In particular, the vehicle ride height may be changed by changing the frame hanger to another with a different dimension between the frame attachment holes and the shear spring pockets. The vehicle ride height may also be changed by changing the saddle to another with a different dimension between the center hub interface and the spring mount interfaces thereof. In addition, replacement of both the frame hanger and saddle with others having different dimensions may change the vehicle ride height.

The principles described herein may also be used in a variety of elastomeric spring suspensions for a variety of axle configurations. For example, while an elastomeric spring suspension for a tandem axle chassis having an equalizing beam has been described, the principles extend to single axle chasses, to tandem axle chasses without equalizing beams, and to tridem axle chasses (with or without equalizing beams), by exchanging the saddle for another with the appropriate axle interface.

In addition, load capacity for the suspension may be increased or reduced to match chassis size by the addition or subtraction of spring modules, or partial spring modules, to the frame hanger assembly, or by replacement of the progressive spring rate load cushion with another having a flattened top surface (apex) with a larger surface area.

FIG. 22 illustrates another elastomeric spring suspension 200 designed preferably for use with a vocational or heavy haul truck having a tandem axle configuration. Three full spring modules 56 define the frame hanger assembly 202. In addition, the saddle assemblies 204 used in this suspension 200 have three spring mount interfaces. Outside of the foregoing, suspension 200 is similar to suspension 50 illustrated in FIG. 1. The use of additional spring modules 56 generates greater load capacity for suspension 200 than for suspension 50 illustrated in FIG. 1, assuming everything else is identical.

Figure 23:
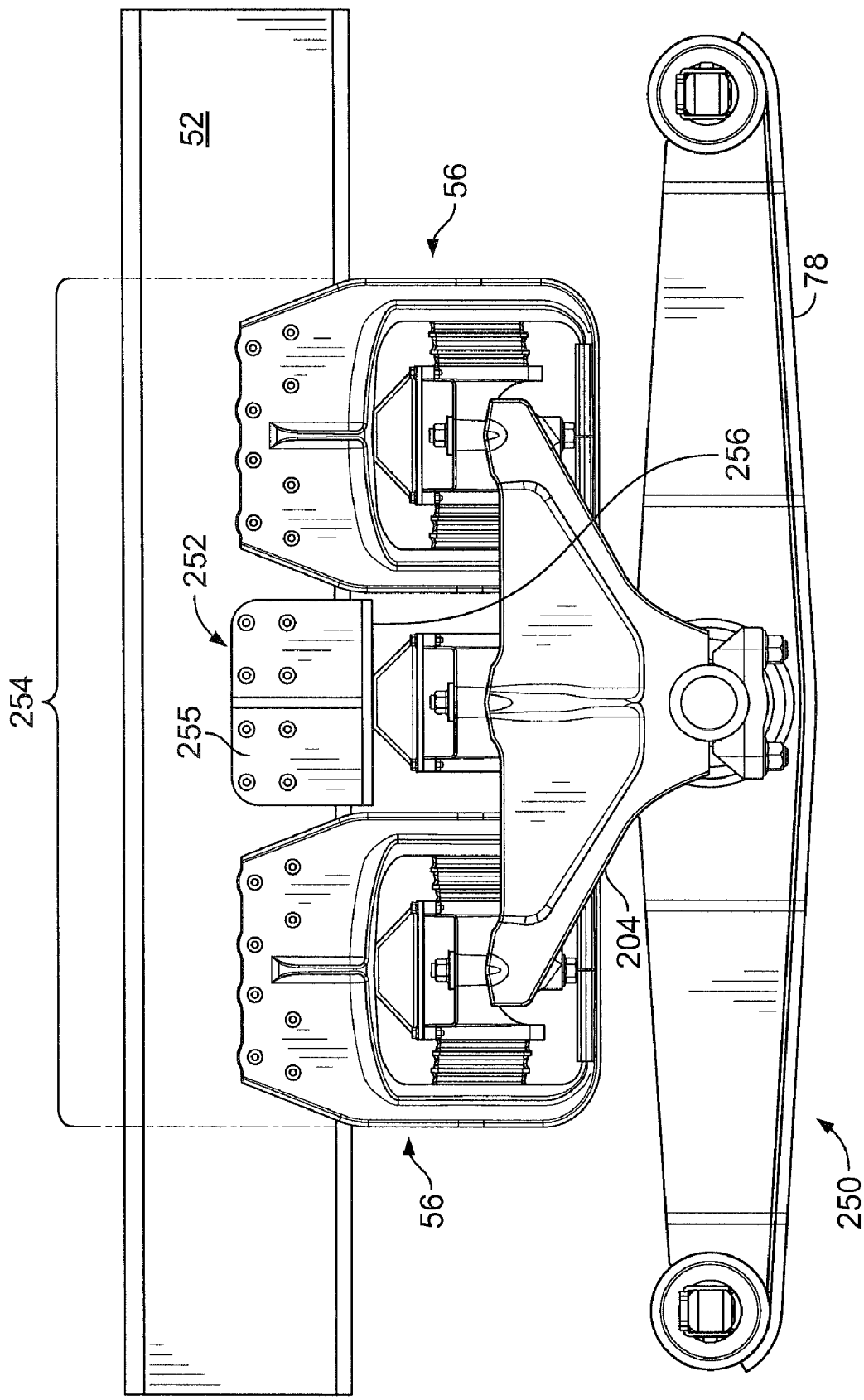
FIG. 23 is a side elevational view of still another suspension constructed in accordance with the principles disclosed herein.

FIG. 23 illustrates yet another elastomeric spring suspension 250 designed preferably for use with a vocational or heavy haul truck having a tandem axle configuration. This suspension has two full spring modules 56 and one half/partial spring module 252 defining the frame hanger assembly 254. The two full spring modules 56 are constructed generally as described in the other suspensions 50, 200 illustrated in FIGS. 1 and 22, respectively. The partial spring module 252 includes a frame attachment portion 255 having a bottom wall 256. An elastomeric progressive spring rate load cushion 72 is retained by fasteners and positioned between the bottom wall 256 and spring mount 70 included as part of the partial spring module 252. The saddle assemblies 204 used in suspension 250 are similar to those used in suspension 200 illustrated in FIG. 22. The use of a partial spring module 252, in addition to the two full spring modules 56, generates greater load capacity for suspension 250 than suspension 50 illustrated in FIG. 1, assuming everything else is identical.

Figure 24A:
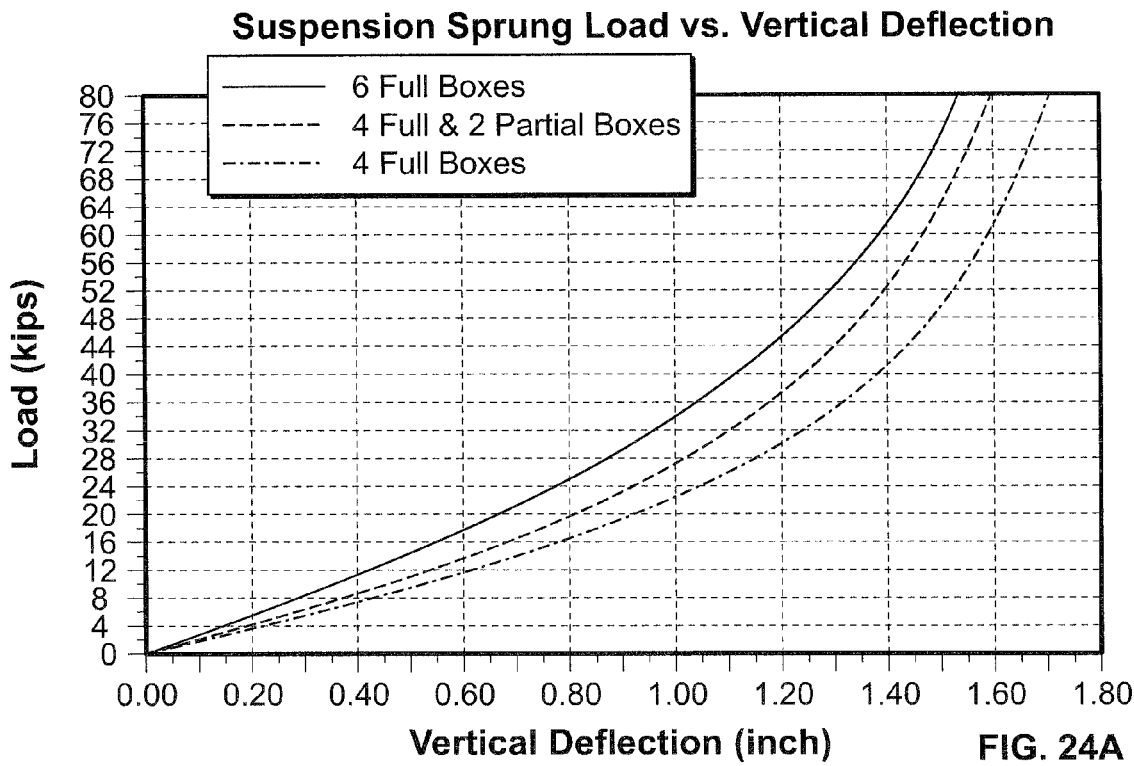
FIGS. 24A and 24B are graphical representations pertaining to the operating characteristics of suspensions constructed in accordance with the principles disclosed herein.

FIG. 24A illustrates a graphical representation of the operating characteristics for suspensions of the type illustrated in FIGS. 1, 22 and 23, respectively. FIG. 24A illustrates suspension sprung load as a function of vertical deflection. As shown, this function is initially generally linear increasing progressively until the amount of vertical deflection begins to taper off as load increases.

Figure 24B:
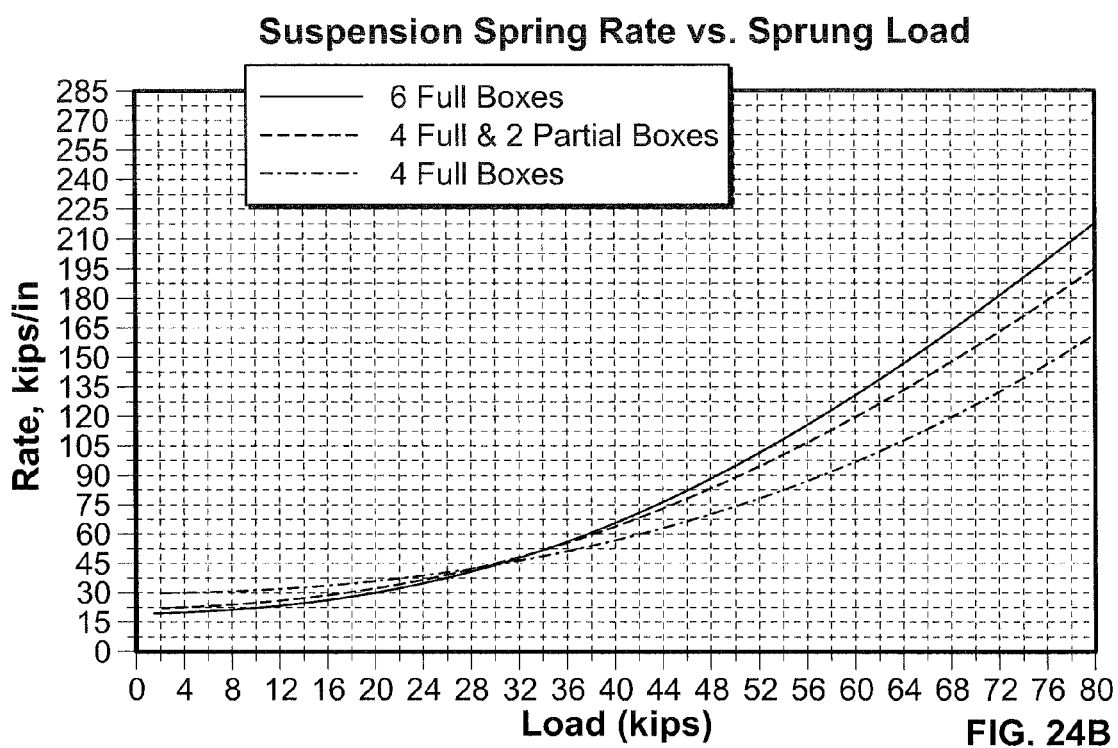

FIG. 24B illustrates a graphical representation of similar operating characteristics for suspensions of the type illustrated in FIGS. 1, 22 and 23, respectively. FIG. 24B illustrates suspension spring rate as a function of suspension sprung load. As shown, the suspensions have a continuously increasing spring rate (curvilinear and with no discontinuities) as a function of load. Moreover, due to the preferred pyramidal shape of the elastomeric progressive spring rate load cushions 72 used in those suspensions, the spring rate increases almost linearly with increasing load. There are no abrupt changes in the vertical spring rate, as is the case with elastomeric spring suspensions utilizing auxiliary springs. These operational characteristics resemble the operational characteristics exhibited by pneumatic suspensions not mechanical suspensions of this type. Accordingly, these suspensions exhibit excellent roll stability without compromising ride quality.

Figure 25:
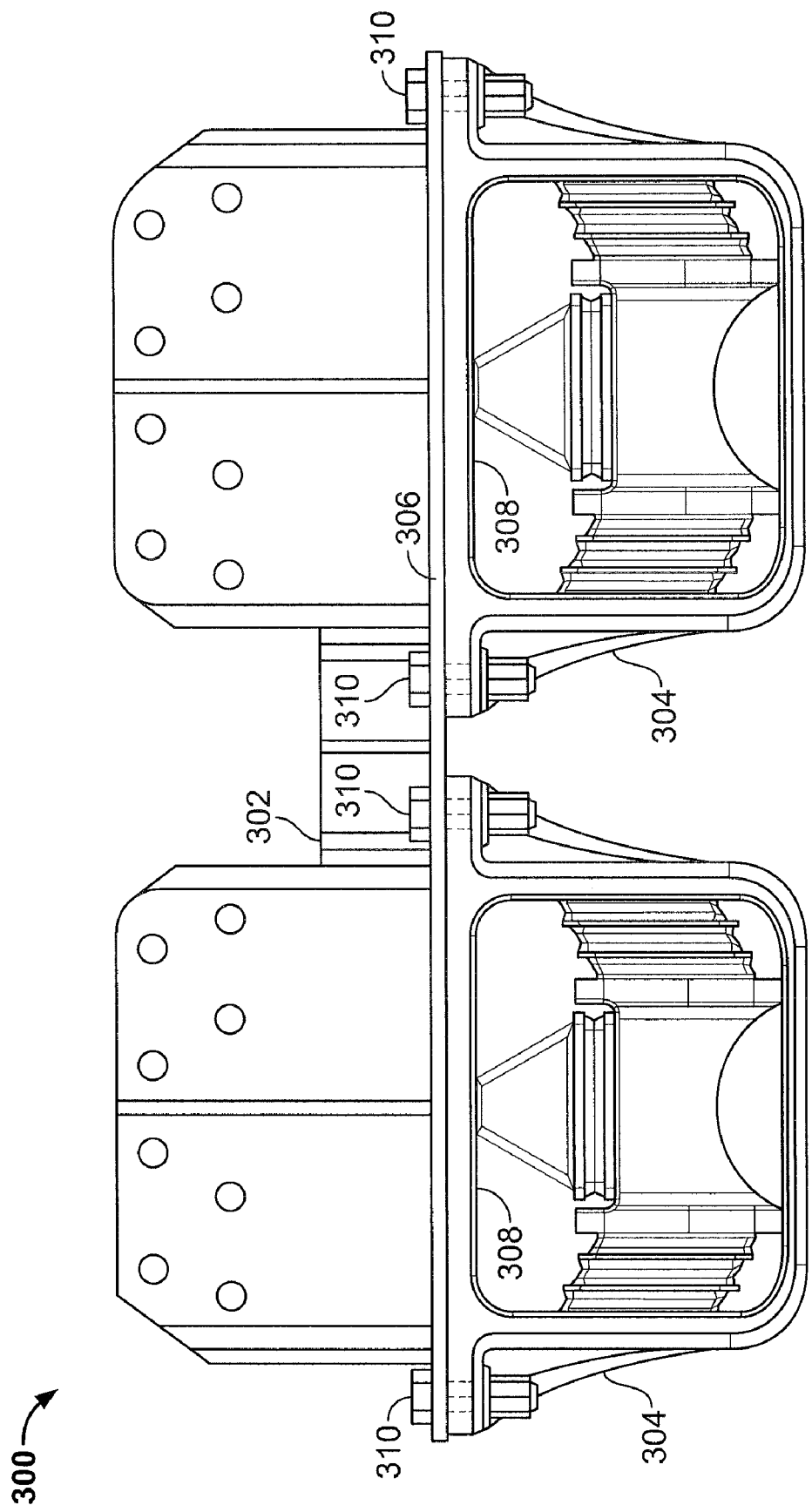
FIG. 25 is a side elevational view of an alternative frame hanger assembly for use in suspensions constructed in accordance with the principles disclosed herein.

FIG. 25 illustrates a frame hanger assembly 300 including a frame interface or attachment brackets 302 and removably attachable suspension attachment or spring modules 304. The frame interface 302 includes a lower wall 306 permitting attachment to upper walls 308 of the spring modules 304 through the use of fasteners 310.

Use of frame hanger assemblies of this type 300 even further enhances the modularity of the suspension system. For example, the replacement of spring modules 304 with other spring modules 304 having springs with a different vertical spring rate for the suspension is facilitated. In addition, multiple vehicle frame configurations (i.e., ride heights and frame widths) can be absorbed through modifications to the hole/bore positions machined through frame interface 302, permitting production of a uniform, universal spring module 304. This results in reduced inventories of parts. This also permits compatibility to any industry standard frame configuration worldwide, while also simplifying assembly.

The modular frame hanger assembly 300 may also be universal in the sense that it can be sized and adapted for all truck frame configurations. As a result, a single spring module 304 can be used for all truck frame configurations. Various frame interfaces 302 will be used for each particularly different truck frame configuration.

While this invention has been described with reference to certain illustrative aspects, it will be understood that this description shall not be construed in a limiting sense. Rather, various changes and modifications can be made to the illustrative embodiments without departing from the true spirit and scope of the invention, as defined by the following claims. Furthermore, it will be appreciated that any such changes and modifications will be recognized by those skilled in the art as an equivalent to one or more elements of the following claims, and shall be covered by such claims to the fullest extent permitted by law.

The invention claimed is:

1. A suspension for supporting a longitudinally extending vehicle frame rail, comprising:
   a first spring module housing adapted to receive a first spring, a second spring, and a first spring mount;
   said first spring module housing having an opening defined by a top wall, a bottom wall, and first and second side walls of said first spring module and further including a first frame attachment portion adapted for mounting to said vehicle frame rail;
   said first spring mount positioned within the opening of said first spring module housing;
   a saddle adapted for connection to said first spring mount and adapted for connection to a beam; and
   a second spring module housing adapted to receive a third spring, a fourth spring, and a second spring mount;
   said second spring module housing having an opening defined by a top wall, a bottom wall, and first and second side walls of said second spring module and further including a second frame attachment portion adapted for mounting to said vehicle frame rail; and
   said second spring mount positioned within the opening of said second spring module housing and adapted for connection to the saddle.

2. The suspension of claim 1 wherein said first spring comprises a first shear spring, said second spring comprises a first load cushion and said first and second springs are positioned within said opening of said first spring module housing.

3. The suspension of claim 2 wherein said opening of said first spring module housing is defined by a top wall, a bottom wall, and first and second side walls of said first spring module housing.

4. The suspension of claim 3 wherein said first spring mount is centrally positioned between the first and second side walls of said opening of said first spring module housing and said first shear spring is retained in compression between one of said first and second side walls and said first spring mount, and said first load cushion is positioned between said top wall and said first spring mount.

5. The suspension of claim 4 wherein said top wall has a dome-like configuration to control bulging of the load cushion during loaded conditions.

6. The suspension of claim 4, wherein said load cushion is an elastomeric progressive rate load cushion.

7. The suspension of claim 4 wherein said first spring further comprises a second shear spring that is retained in compression between one of said first and second side walls and said first spring mount.

8. The suspension of claim 3 wherein said bottom wall serves as an integrated rebound control.

9. The suspension of claim 2 wherein said first load cushion is an elastomeric progressive spring rate load cushion.

10. The suspension of claim 9 wherein said first elastomeric progressive spring rate load cushion has a generally pyramidal shape with a flattened top surface.

11. The suspension of claim 1 wherein the saddle is connected to the spring mount.

12. The suspension of claim 11 wherein the saddle is removably connected to the spring mount.

13. The suspension of claim 12 wherein the saddle includes a first member downwardly extending from a first side of said spring mount and adapted for connection to an equalizing beam and a second member downwardly extending from a second side of said spring mount and adapted for connection to the equalizing beam.

14. The suspension of claim 1 wherein the saddle is removably connected to the spring mount.

15. The suspension of claim 14 wherein the saddle includes a first member downwardly extending from a first side of said spring mount and adapted for connection to an equalizing beam and a second member downwardly extending from a second side of said spring mount and adapted for connection to the equalizing beam.

16. A suspension for supporting a longitudinally extending vehicle frame rail above first and second axles forming a tandem axle configuration, comprising:
a frame hanger assembly adapted for mounting to said vehicle frame rail, said frame hanger assembly including a first spring module;
a first elastomeric shear spring included within said first spring module and retained in compression therein;
a first elastomeric progressive spring rate load cushion included within said first spring module;
a first spring mount included within said first spring module; and
a saddle adapted for connection to said first spring mount and adapted for connection to an equalizing beam, wherein said frame hanger assembly further includes a second spring module including a second elastomeric shear spring retained in compression, a second elastomeric progressive spring rate load cushion, and a second spring mount.

17. The suspension of claim 16 wherein the saddle is connected to the spring mount.

18. The suspension of claim 17 wherein the saddle is removably connected to the spring mount.

19. The suspension of claim 18 wherein the saddle includes a first member downwardly extending from a first side of said spring mount and adapted for connection to an equalizing beam and a second member downwardly extending from a second side of said spring mount and adapted for connection to the equalizing beam.

20. A suspension for supporting a longitudinally extending vehicle frame rail above an axle, comprising:
a spring module housing adapted to receive a first spring, a second spring, and a spring mount;
said spring module housing having an opening defined by a top wall, a bottom wall, and first and second side walls of said spring module and including a frame attachment portion adapted for mounting to said vehicle frame rail;
said spring mount positioned within said opening of said spring module housing;
said first spring comprising a first shear spring positioned within said spring module housing and retained in compression therein between the first side wall of the spring module housing and a first side of the spring mount, and said second spring comprising a second shear spring positioned within said opening of said spring module housing and retained in compression therein between the second side wall of the spring module housing and a second side of the spring mount; and
a progressive spring rate load cushion positioned within said spring module housing between a top surface of the spring mount and a top wall of the spring module housing, said progressive spring rate load cushion having a continuously increasing spring rate as a vertical load applied to the cushion is increased.

21. The suspension of claim 20 wherein said first shear spring and said second spring are elastomeric.

22. The suspension of claim 21 wherein the first shear spring is retained in compression between a first pocket formed in the first side wall of the spring module housing and a second pocket formed in the first side of the spring mount and the second shear spring is retained in compression between a third pocket formed on the second side wall of the spring module housing and a fourth pocket formed on the second side of the spring mount.

23. The suspension of claim 22 wherein said progressive spring rate load cushion is elastomeric.

24. The suspension of claim 23 wherein said top wall has a dome-like configuration to control bulging of the load cushion during loaded conditions.

25. The suspension of claim 22 wherein said bottom wall serves as an integrated rebound control.

26. The suspension of claim 20 wherein said progressive spring rate load cushion has a generally tapering vertical cross section.

27. The suspension of claim 26 wherein said progressive spring rate load cushion has a generally pyramidal shape with a flattened top surface.

28. The suspension of claim 20 further comprising an equalizing beam connected to said spring module housing.

29. A suspension for supporting a longitudinally extending vehicle frame rail above an axle, comprising:
a frame hanger assembly adapted for mounting to said vehicle frame rail, said frame hanger assembly including a first spring module;
a first elastomeric shear spring included within said first spring module and retained in compression therein;
a first elastomeric progressive spring rate load cushion included within said first spring module;
a first spring mount included within said first spring module; and
a saddle adapted for connection to said first spring mount, wherein said frame hanger assembly further includes a second spring module including a second elastomeric shear spring retained in compression, a second elastomeric progressive spring rate load cushion, and a second spring mount.

30. The suspension of claim 29 wherein the saddle is connected to the spring mount.

31. A frame hanger spring module for use in a vehicle suspension, comprising:
a frame hanger bracket having a frame attachment portion and an opening defined by a top wall, a bottom wall, and first and second side walls of said spring module;
an elastomeric shear spring included within said opening; and
a spring mount included within said opening,
wherein said shear spring is positioned within said opening and retained in compression therein between the first side wall of said opening and a first side wall of the spring mount, and wherein the first side wall of the opening and the first side wall of the spring mount are generally parallel to each other and generally perpendicular to a top surface of the spring mount.

32. The frame hanger spring module of claim 31 further comprising an elastomeric progressive spring rate load cushion positioned between said top surface of said spring mount and said top wall.

33. The frame hanger spring module of claim 32 wherein said elastomeric progressive spring rate load cushion has a generally tapering vertical cross section.

34. The frame hanger spring module of claim 33 wherein said elastomeric progressive spring rate load cushion has a generally pyramidal shape with a flattened top surface and has a continuously increasing spring rate as a vertical load applied to the cushion is increased.

35. The frame hanger spring module of claim 32 further comprising an additional elastomeric shear spring retained in compression between said second side wall of the opening and a second side wall of the spring mount and wherein the second side wall of the opening and the second side wall of the spring mount are parallel to each other and perpendicular to said top surface of the spring mount.

36. The frame hanger spring module of claim 31 further comprising an additional elastomeric shear spring retained in compression between said second side wall of the opening and a second wall of the spring mount, wherein the second side wall of the opening and the second side wall of the spring mount are parallel to each other and perpendicular to a top surface of the spring mount.

37. The frame hanger spring module of claim 31 wherein said spring mount is centrally positioned between the first and second side walls of said opening.

38. The frame hanger spring module of claim 31 wherein said top wall has a dome-like configuration to control bulging of the load cushion during loaded conditions.

39. The frame hanger spring module of claim 31 wherein said bottom wall serves as an integrated rebound control.

40. A suspension for supporting a longitudinally extending vehicle frame rail above an axle, comprising:
 a spring module housing having an opening defined by a top wall, a bottom wall, and first and second side walls of said spring module and adapted to receive a first shear spring, a second shear spring, and a spring mount within said opening of the spring module housing;
 said spring module housing including a frame attachment portion adapted for mounting to said vehicle frame rail;
 said spring mount positioned within said opening of said spring module housing;
 said first shear spring positioned within said opening of said spring module housing and retained in compression therein between the first side wall of the spring module housing and a first side of the spring mount, and said second shear spring positioned within said opening of said spring module housing and retained in compression therein between the second side wall of the spring module housing and a second side of the spring mount; wherein the first shear spring and the second shear spring are retained in compression such that they act in compression and or shear only during loading and do not undergo tensile loading during acceleration or deceleration.

41. The suspension of claim 40, wherein the first shear spring is retained in compression between a first pocket formed in the first side wall of the spring module housing and a second pocket formed in the first side of the spring mount and the second shear spring is retained in compression between a third pocket formed on the second side wall of the spring module housing and a fourth pocket formed on the second side of the spring mount.

42. The suspension of claim 41, wherein the first shear spring and the second shear spring are retained in compression without the use of any fasteners.

43. The suspension of claim 40, wherein the first shear spring and the second shear spring are retained in compression under approximately 13,000 pounds of load.

44. The suspension of claim 40, further including a progressive spring rate load cushion positioned within said opening of said spring module housing between a top surface of the sprint mount and the top wall of the spring module housing.

45. The suspension of claim 44, wherein the progressive spring rate load cushion has a continuously increasing spring rate as a vertical load applied to the load cushion is increased.

* * * * *